(12) United States Patent
Peebler et al.

(10) Patent No.: US 11,803,293 B2
(45) Date of Patent: Oct. 31, 2023

(54) MERGING VIRTUAL OBJECT KITS

(71) Applicant: Apple Inc., Cupertino, CA (US)

(72) Inventors: Bradley W. Peebler, San Mateo, CA (US); Jack R. Greasley, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/556,583

(22) Filed: Aug. 30, 2019

(65) Prior Publication Data

US 2020/0073521 A1 Mar. 5, 2020

Related U.S. Application Data

(60) Provisional application No. 62/725,089, filed on Aug. 30, 2018.

(51) Int. Cl.

| | |
|---|---|
| *G06F 3/0484* | (2022.01) |
| *G06T 19/20* | (2011.01) |
| *G06F 3/0482* | (2013.01) |
| *G06F 3/04817* | (2022.01) |
| *G06F 3/0481* | (2022.01) |
| *G06T 19/00* | (2011.01) |
| *G06Q 20/12* | (2012.01) |

(52) U.S. Cl.
CPC .......... *G06F 3/0484* (2013.01); *G06F 3/0481* (2013.01); *G06F 3/0482* (2013.01); *G06F 3/04817* (2013.01); *G06Q 20/1235* (2013.01); *G06T 19/00* (2013.01); *G06T 19/20* (2013.01); *G06T 2219/2008* (2013.01)

(58) Field of Classification Search
CPC .................................................. G06Q 20/1235
See application file for complete search history.

(56) References Cited

U.S. PATENT DOCUMENTS

| | | | | |
|---|---|---|---|---|
| 10,656,801 | B1 * | 5/2020 | Goodman | G06F 3/0484 |
| 2011/0022992 | A1 * | 1/2011 | Zhou | G06T 13/40 |
| | | | | 345/473 |
| 2012/0254791 | A1 * | 10/2012 | Jackson | G06F 3/04815 |
| | | | | 715/781 |
| 2016/0350716 | A1 * | 12/2016 | Raghunath | G06F 3/04842 |
| 2017/0052676 | A1 * | 2/2017 | Pulier | G06F 3/04883 |
| 2018/0122138 | A1 * | 5/2018 | Piya | G06T 19/20 |
| 2018/0330096 | A1 * | 11/2018 | Breindel | A63F 13/358 |
| 2019/0095436 | A1 * | 3/2019 | Martinazzi | G06F 16/951 |
| 2019/0114840 | A1 * | 4/2019 | Zankowski | G06F 40/186 |

* cited by examiner

*Primary Examiner* — Cesar B Paula
*Assistant Examiner* — Sajeda Muhebbullah
(74) *Attorney, Agent, or Firm* — Fernando & Partners LLP

(57) ABSTRACT

In various implementations, a method includes obtaining a first virtual object kit that corresponds to a first virtual object type. In various implementations, the method includes obtaining a second virtual object kit corresponding to a second virtual object type that is different from the first virtual object type. In various implementations, the method includes merging the first virtual object kit and the second virtual object kit in order to form a third virtual object kit. In some implementations, the third virtual object kit includes a set of virtual object templates of a third virtual object type that is different from the first virtual object type and the second virtual object type. In some implementations, the third virtual object kit includes a plurality of groups of components associated with respective portions of a virtual object.

22 Claims, 22 Drawing Sheets

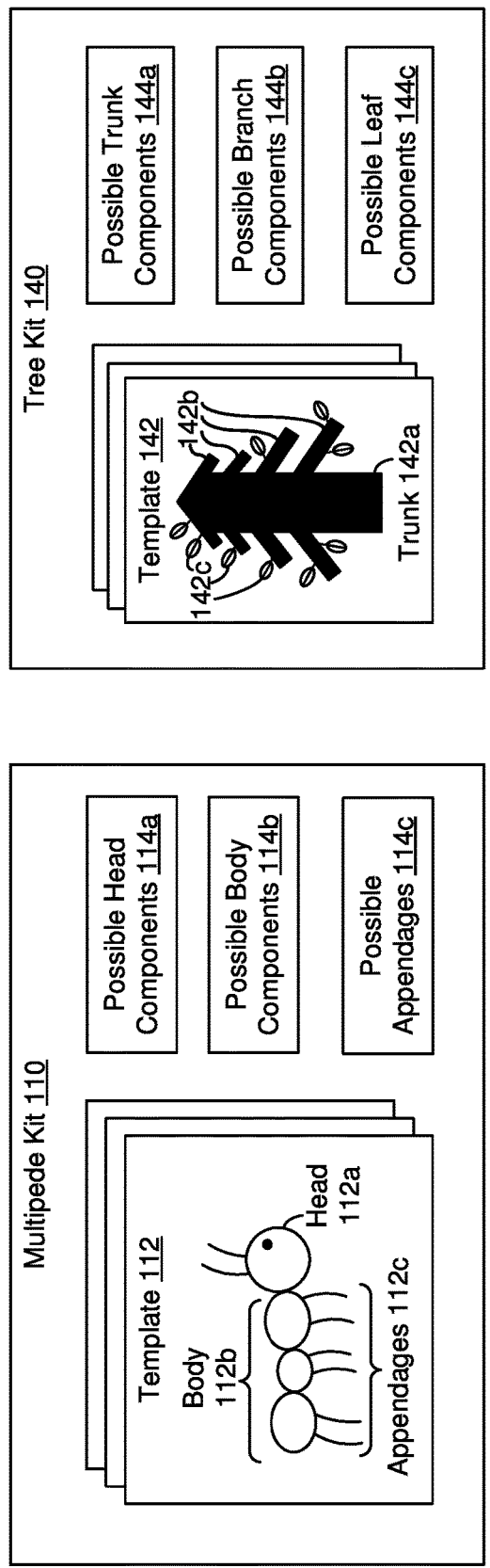
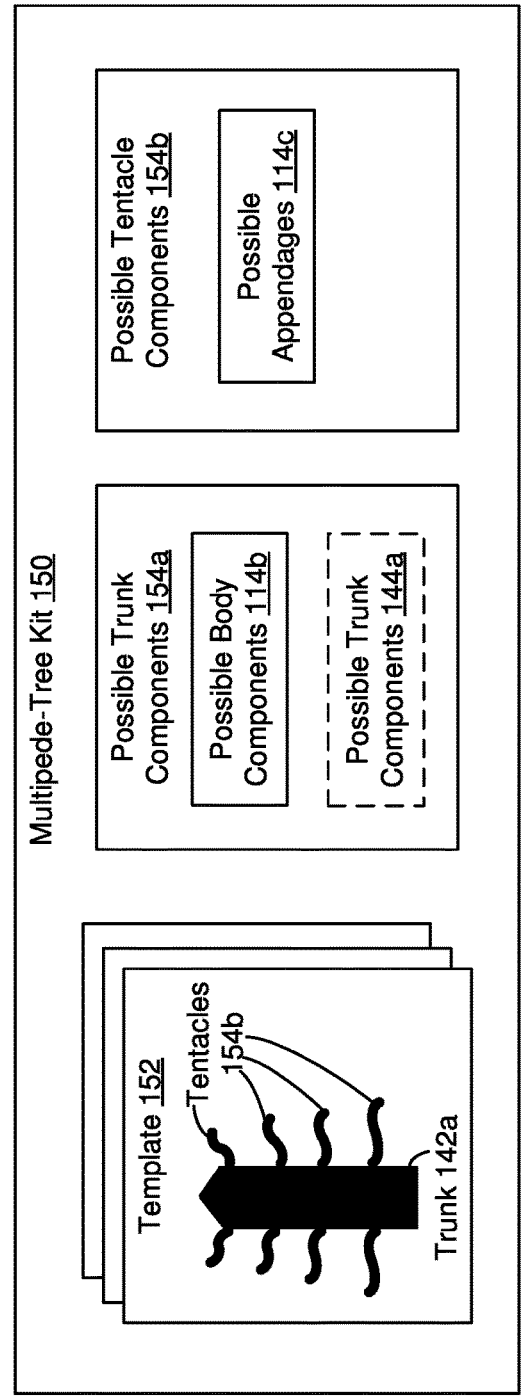
Figure 1S

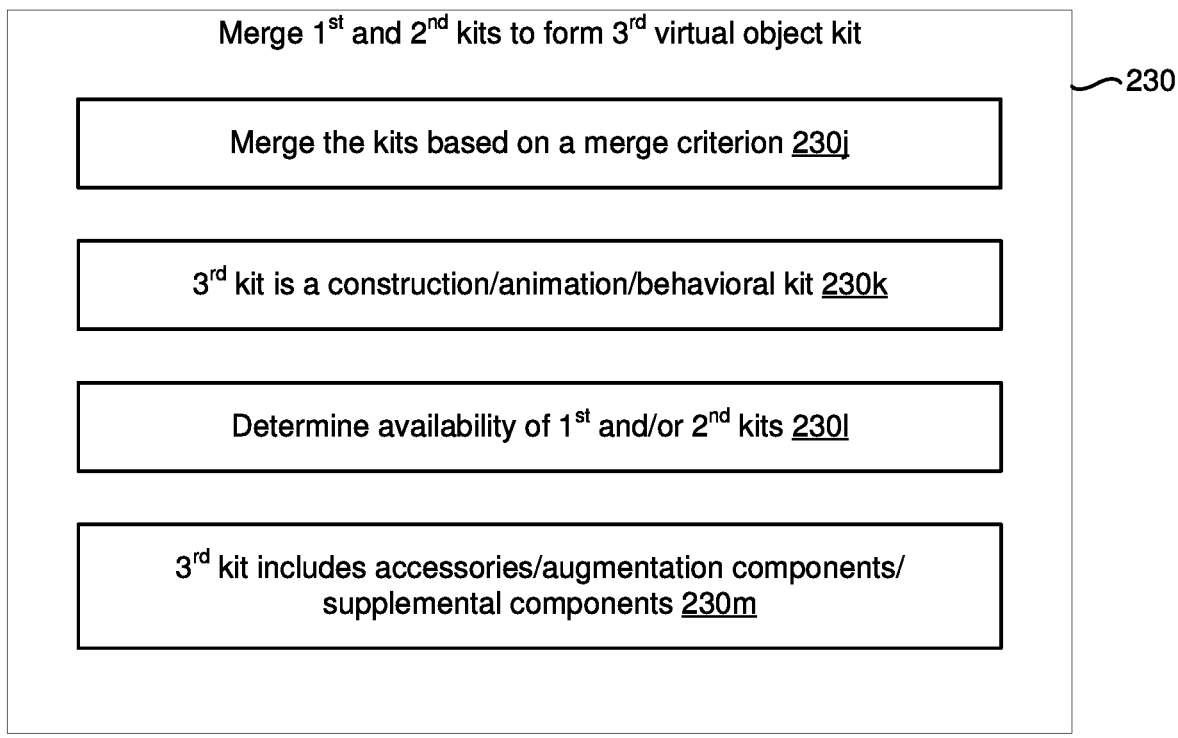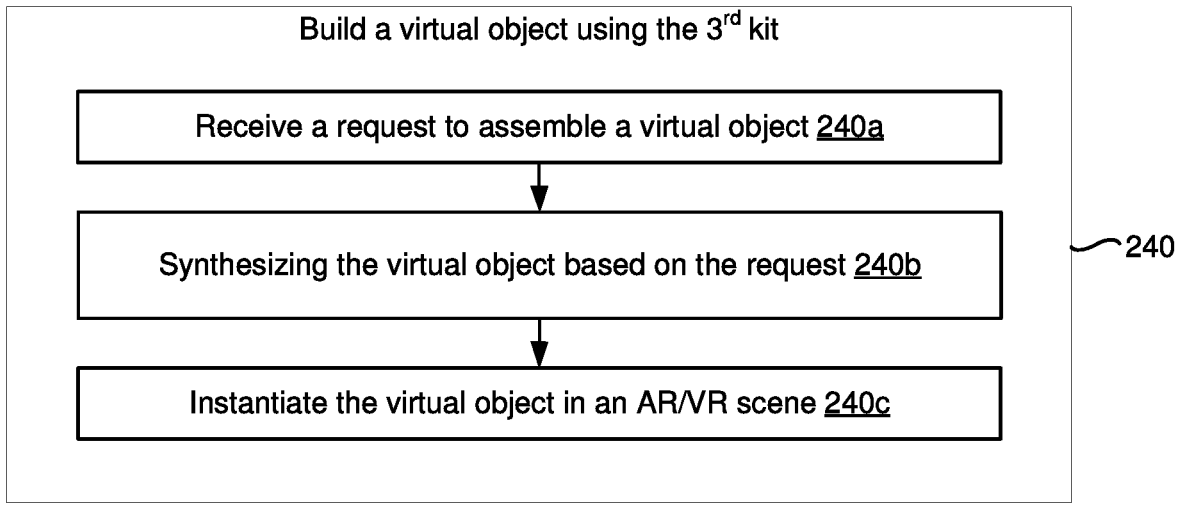
Figure 2B

MERGING VIRTUAL OBJECT KITS

CROSS REFERENCE TO RELATED APPLICATIONS

This application claims priority to U.S. patent application Ser. No. 62/725,089, filed on Aug. 30, 2018, which is hereby incorporated by reference in its entirety.

TECHNICAL FIELD

The present disclosure generally relates to merging virtual object kits.

BACKGROUND

Some devices are capable of generating and presenting computer-generated reality (CGR) environments. Some CGR environments include virtual environments that are simulated replacements of physical environments. Some CGR environments include augmented environments that are modified versions of physical environments. Some devices that present CGR environments include mobile communication devices such as smartphones, head-mountable displays (HMDs), eyeglasses, heads-up displays (HUDs), and optical projection systems. Most previously available devices that present CGR environments are ineffective at presenting representations of certain objects. For example, some previously available devices that present CGR environments are unsuitable for presenting representations of objects that are associated with an action.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 2A-2B are flowchart representations of a method of merging virtual object kits in accordance with some implementations.

Figure 1A:
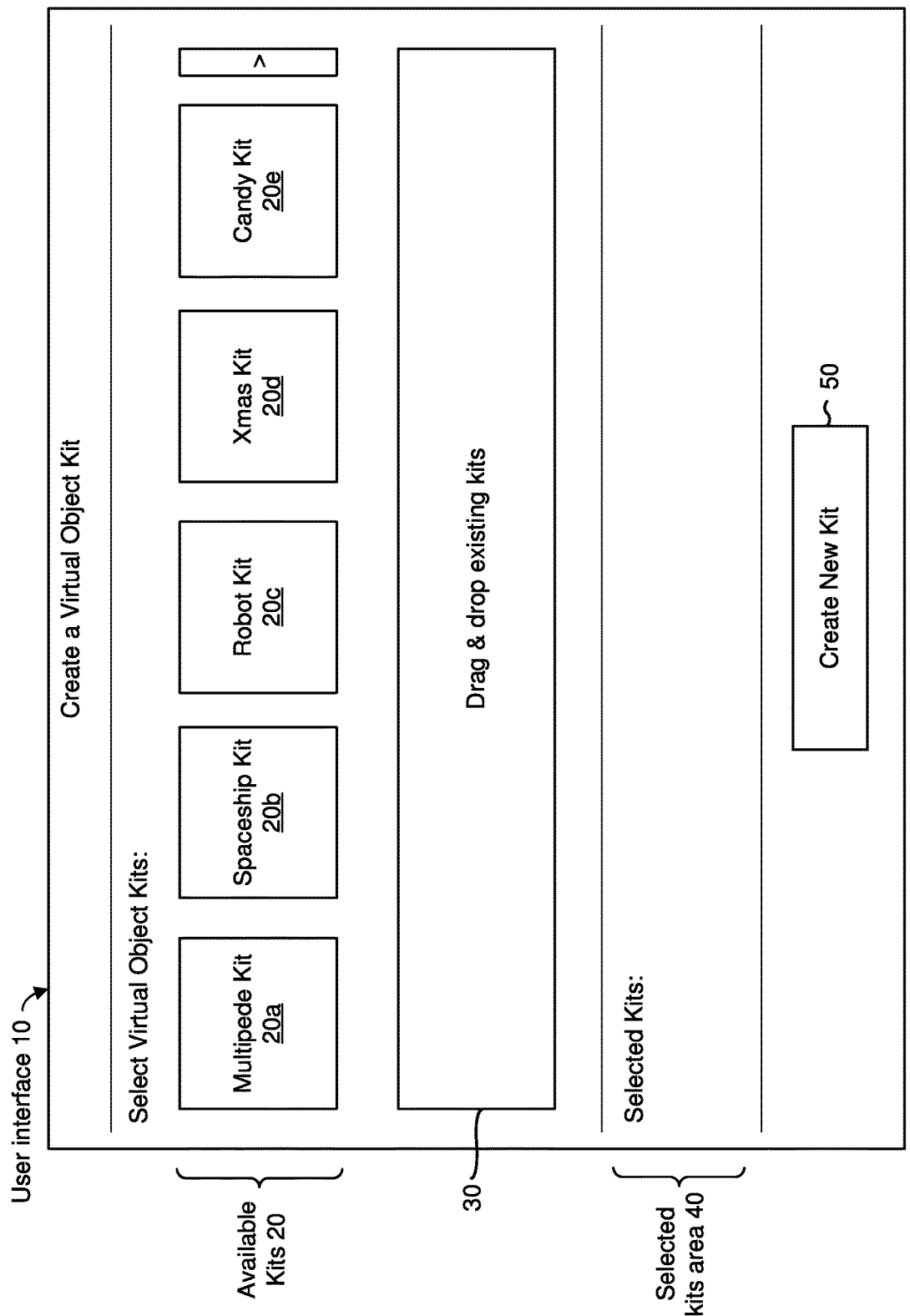
FIGS. 1A-1Q are diagrams of a user interface for merging virtual object kits in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for merging virtual object kits. In various implementations, a device includes a non-transitory memory and one or more processors coupled with the non-transitory memory. In various implementations, a method includes obtaining a first virtual object kit that corresponds to a first virtual object type. In various implementations, the method includes obtaining a second virtual object kit corresponding to a second virtual object type that is different from the first virtual object type. In various implementations, the method includes merging the first virtual object kit and the second virtual object kit in order to form a third virtual object kit. In some implementations, the third virtual object kit includes a set of virtual object templates of a third virtual object type that is different from the first virtual object type and the second virtual object type. In some implementations, the third virtual object kit includes a plurality of groups of components associated with respective portions of a virtual object.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

The present disclosure provides methods, systems, and/or devices for merging virtual object kits to form a new virtual object kit. In various implementations, a user of a device can use the new virtual object kit to assemble virtual objects. Merging virtual object kits allows the user to build a virtual object that includes components from different virtual object kits. As such, the user is not limited to components that are in a particular virtual object kit. Merging virtual object kits also enables the user to build virtual objects that are of a new virtual object type. As such, the user is not limited to building virtual objects of existing virtual object types. Merging virtual object kits enables the user to use components from one virtual object kit to build a virtual object from another virtual object kit. Merging virtual object kits enhances the user experience of a device by allowing a user of the device to create a customized virtual object kit. Merging virtual object kits improves the functionality of the device by enabling the device to synthesize virtual objects of a new virtual object type.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1A is a diagram of a user interface 10 for creating a new virtual object kit. In some implementations, the user interface 10 enables a user of a device to create a new virtual object kit by merging two or more existing virtual object kits. In some implementations, the user interface 10 displays affordances 20 for selecting at least some of the existing virtual object kits. In some implementations, the user interface 10 includes an import kit element 30 that enables a user to import an existing virtual object kit. As illustrated in FIG. 1A, in some implementations, the user interface 10 includes a selected kits area 40 that indicates which existing virtual object kits the user has selected to create a new virtual object kit. In some implementations, the user interface 10 includes a create kit affordance 50 that, when activated, triggers the creation of a new virtual object kit by merging existing virtual object kits identified in the selected kits area 40.

In the example of FIG. 1A, the affordances 20 include a multipede kit affordance 20a for selecting a multipede virtual object kit that is used to synthesize multipede virtual objects. In some examples, the affordances 20 include a spaceship kit affordance 20b for selecting a spaceship virtual object kit that is used to synthesize spaceship virtual objects. In some implementations, the affordances 20 include a robot kit affordance 20c for selecting a robot virtual object kit that is used to synthesize robot virtual objects. In the example of FIG. 1A, the affordances 20 include an Xmas kit affordance 20f for selecting an Xmas virtual object kit that is used to synthesize Xmas virtual objects. In some examples, the affordances 20 include a candy kit affordance 20e for selecting a candy virtual object kit that is used to synthesize candy virtual objects. Although the example of FIG. 1A shows five particular affordances 20a-20e, in some implementations, the user can view additional affordances (e.g., by tapping the right arrow shown in FIG. 1A).

In some implementations, the affordances 20 represent virtual object kits that are available in a digital asset store (e.g., a virtual object kit store). In some implementations, the affordances 20 represent virtual object kits that are available for purchase from the digital asset store. In some implementations, the affordances 20 represent virtual object kits that a user of a device has purchased (e.g., from the digital asset store). In some implementations, the affordances 20 represent virtual object kits that are stored on a device displaying the user interface 10.

In some implementations, the import kit element 30 enables a user of the device displaying the user interface 10 to import an existing virtual object kit in order to merge the imported virtual object kit with another existing virtual object kit to form a new virtual object kit. In some implementations, the import kit element 30 enables a user to drag-and-drop an existing virtual object kit into the import kit element 30.

In some implementations, the selected kits area 40 indicates existing virtual object kits that the user has selected to merge. For example, in some implementations, the selected kits area 40 displays representations of virtual object kits that the user selected from the available virtual object kits represented by the affordances 20. In some implementations, the selected kits area 40 provides an option to remove virtual object kits that the user inadvertently selected.

In some implementations, the create kit affordance 50, when selected, triggers the creation of a new virtual object kit by merging the existing virtual object kits identified in the selected kits area 40. In some implementations, the create kit affordance 50 is disabled (e.g., inactive, for example, unselectable) prior to the user selecting at least two existing virtual object kits. In such implementations, the create kit affordance is enabled (e.g., rendered selectable) after the user selects at least two existing virtual object kits.

Figure 1B:
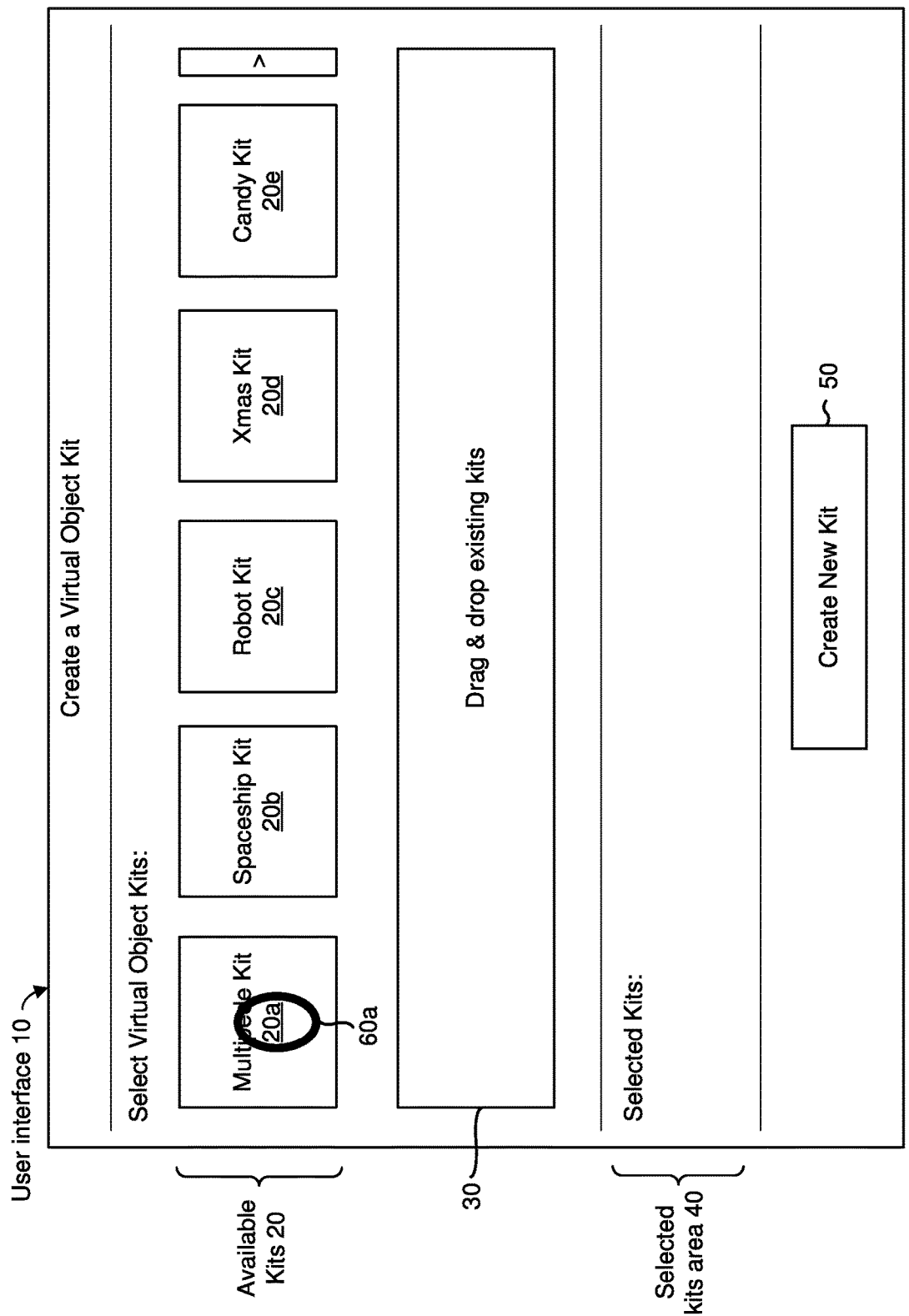
FIGS. 1R-1S are diagrams of example virtual object kits in accordance with some implementations.

FIG. 1B illustrates a user input 60a selecting the multipede kit affordance 20a. In some implementations, the user input 60a corresponds to a request to use the multiple virtual object kit in order to form a new virtual object kit.

Figure 1C:
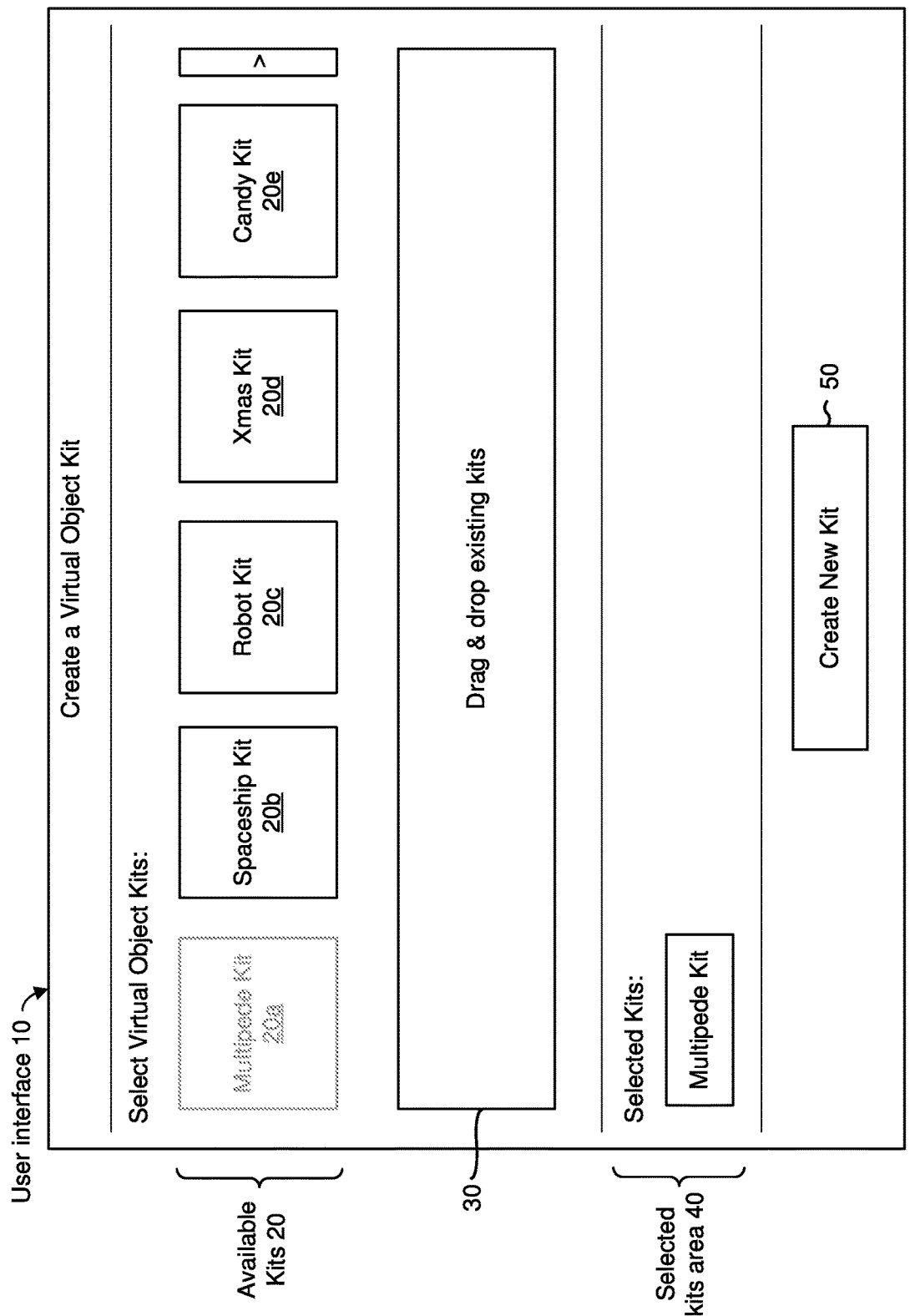

As shown in FIG. 1C, in response to receiving the user input 60a in FIG. 1B, the selected kits area 40 indicates that the user has selected the multipede virtual object kit in order to form a new virtual object kit. In the example of FIG. 1C, an appearance of the multipede kit affordance 20a is changed (e.g., the multipede kit affordance 20a is grayed-out) in order to indicate that the user has selected the multipede virtual object kit to create a new virtual object kit. In some implementations, the selected kits area 40 provides an option to remove (e.g., unselect) the multipede virtual object kit (e.g., by left-swiping the representation of the multipede virtual object kit shown in the selected kits area 40).

Figure 1D:
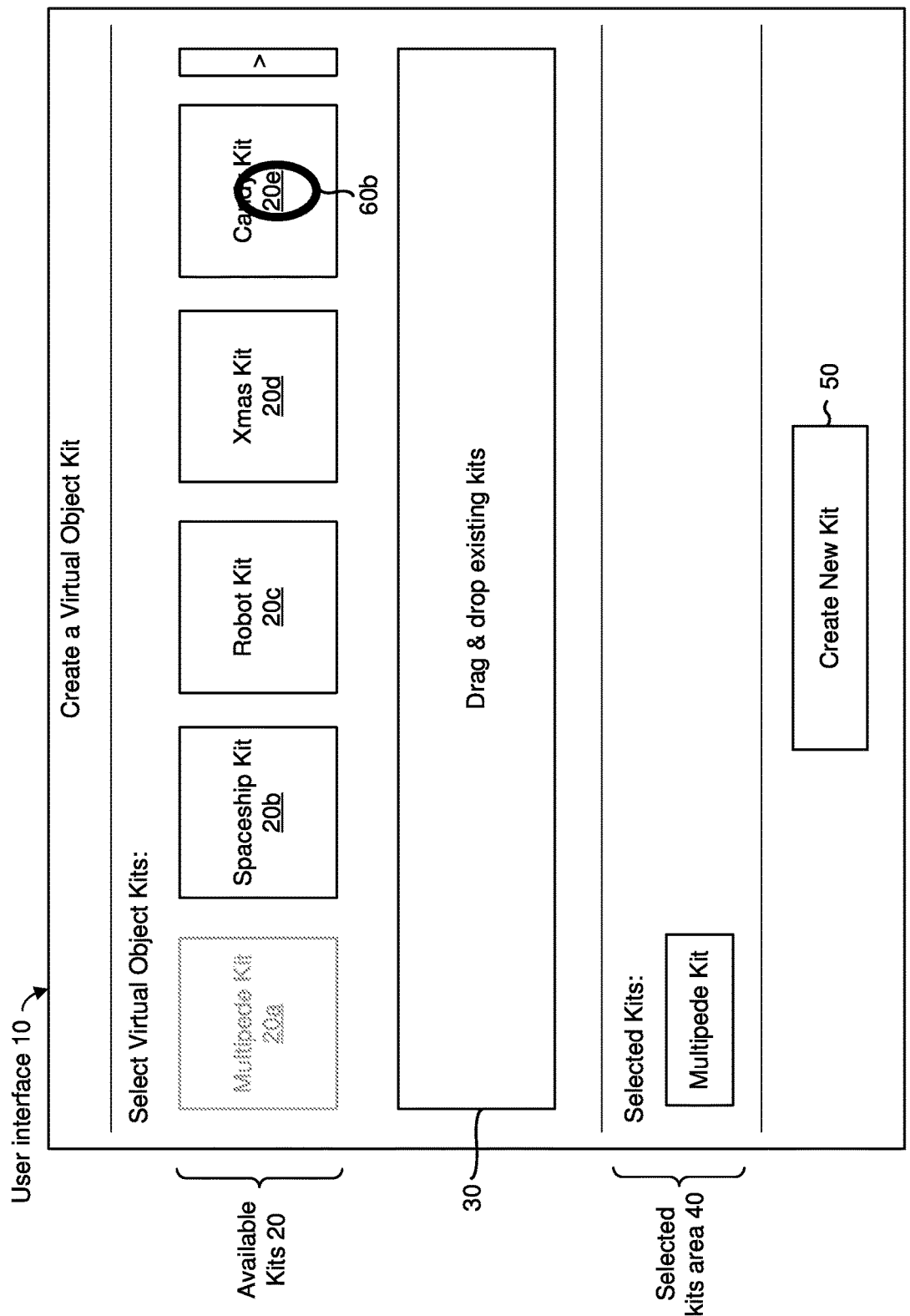

FIG. 1D illustrates a user input 60b selecting the candy kit affordance 20e. In some implementations, the user input 60b corresponds to a request to use the candy virtual object kit along with the multipede virtual object kit in order to form the new virtual object kit.

Figure 1E:
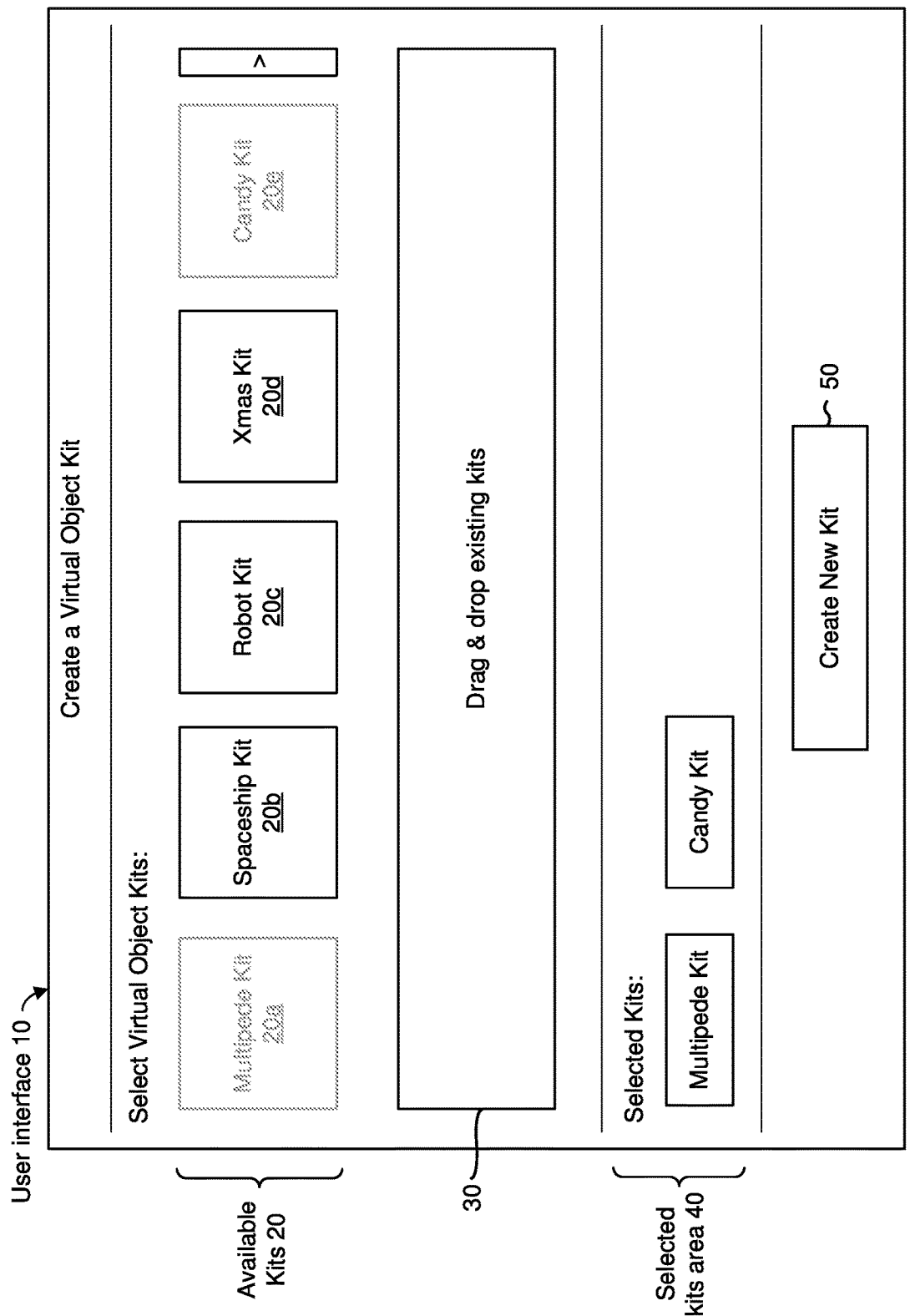

As shown in FIG. 1E, in response to receiving the user input 60b in FIG. 1D, the selected kits area 40 indicates that the user has selected the candy virtual object kit along with the multipede virtual object kit in order to form the new virtual object kit. As such, the user interface 10 displays a representation of the candy virtual object kit adjacent to the representation of the multipede virtual object kit in the selected kits area 40.

Figure 1F:
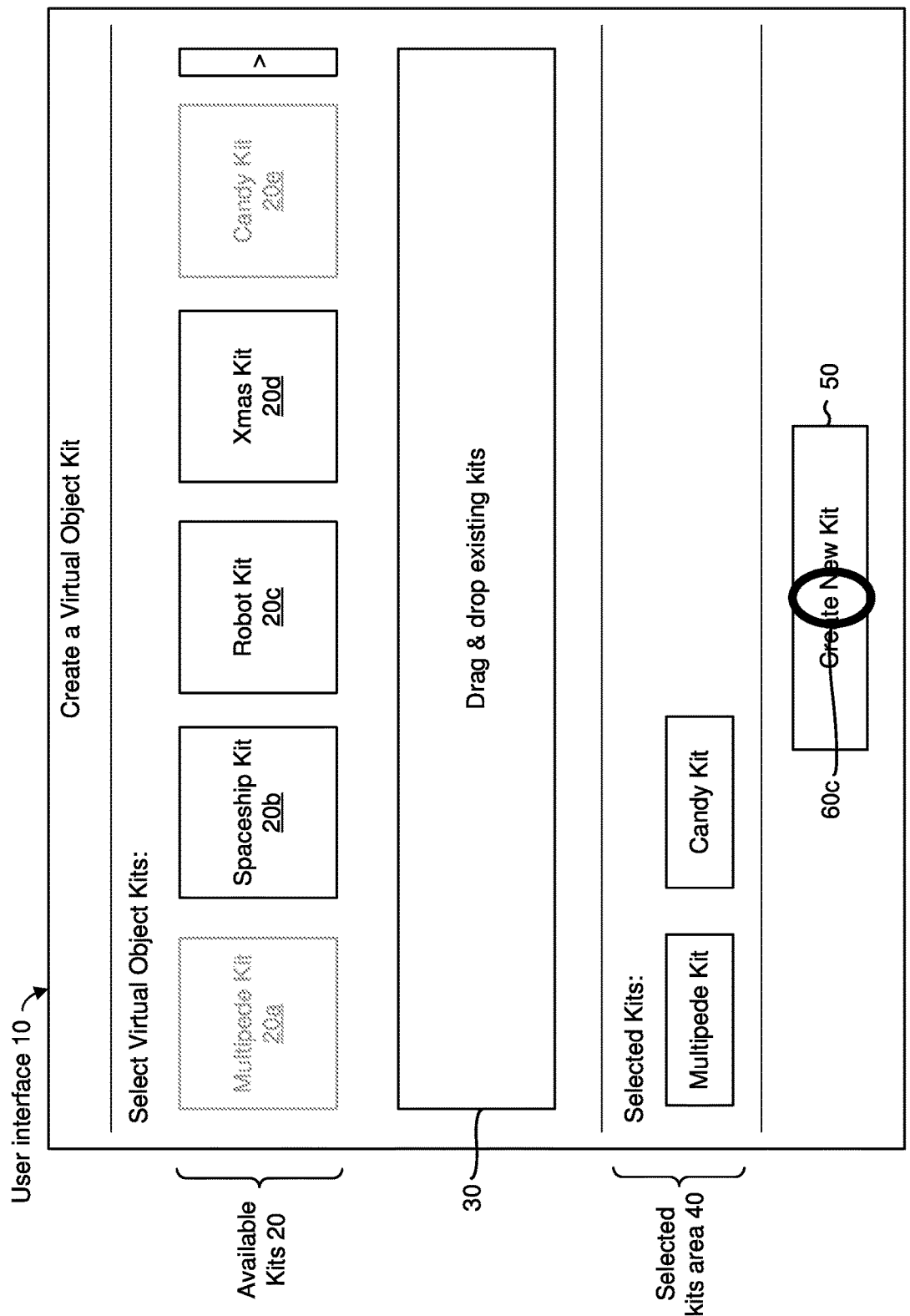

FIG. 1F illustrates a user input 60c selecting the create kit affordance 50. The user input 60c corresponds to a request to create a new virtual object kit based on the multipede virtual object kit and the candy virtual object kit. In some implementations, the user input 60c corresponds to a request to merge the multipede virtual object kit and the candy virtual object kit in order to form a new virtual object kit.

Figure 1G:
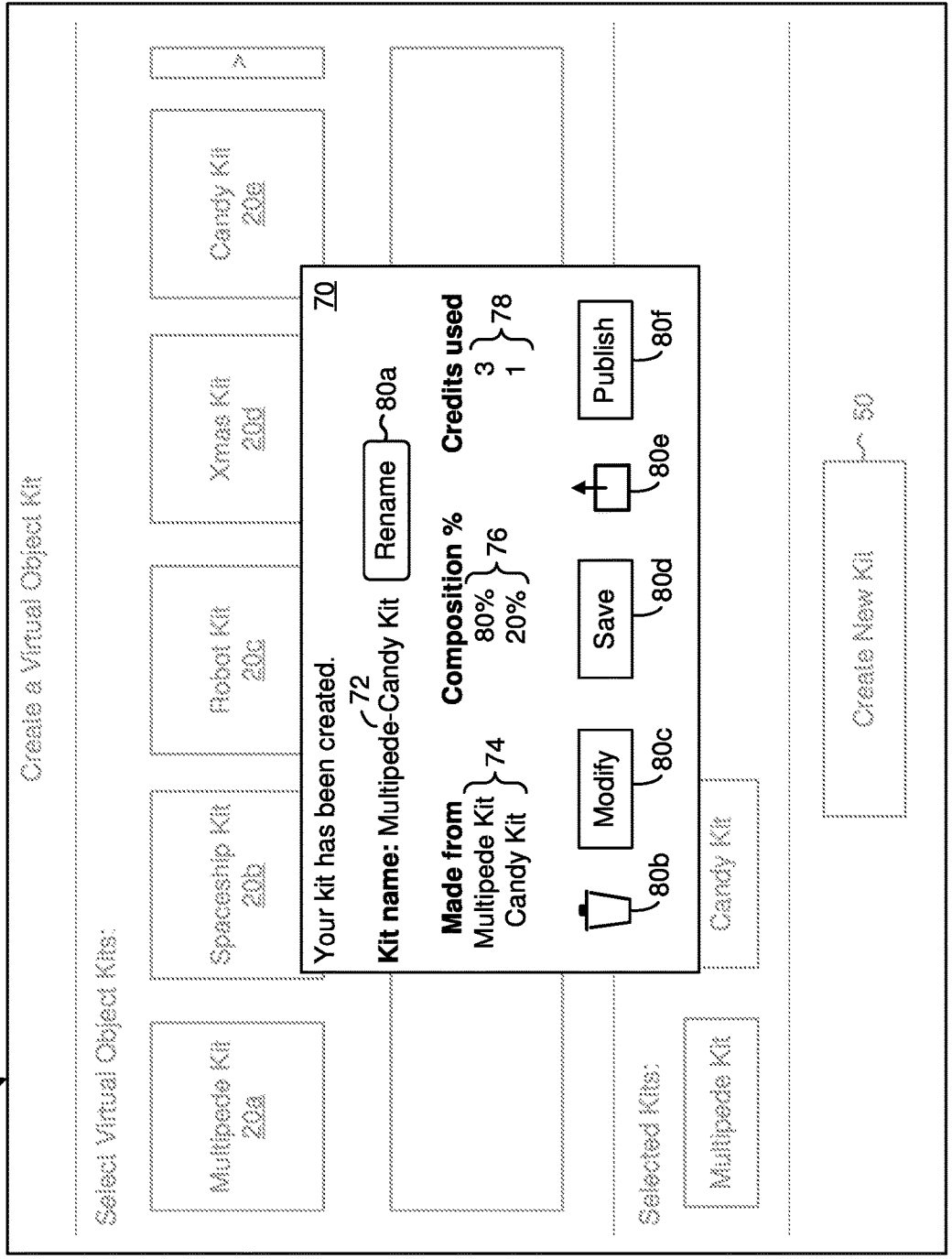

FIG. 1G illustrates a new kit notification 70. In some implementations, the new kit notification 70 displays information regarding the new virtual object kit. For example, in some implementations, the new kit notification 70 displays a kit name 72, kit components 74, composition percentages 76, and credits used 78 to create the new virtual object kit. In some implementations, the kit name 72 is a concatenation of the virtual object kits that were used to create the new virtual object kit. In some implementations, the kit components 74 identify the virtual object kits that were merged to form the new virtual object kit. In some implementations, the composition percentages 76 indicate percentages of the new virtual object kit that are attributable to respective kit components 74 (e.g., 80% of the new multipede-candy virtual object kit is made from the multipede virtual object kit, and 20% of the new multipede-candy virtual object kit is made from the candy virtual object kit). In some implementations, the credits used 78 indicate an amount of credits that were distributed (e.g., paid) to respective entities that created the kit components 74 (e.g., three credits were distributed to a creator of the multipede virtual object kit, and one credit was distributed to a creator of the candy virtual object kit).

In some implementations, the new kit notification 70 includes various affordances to perform operations with respect to the new multipede-candy virtual object kit. For example, in some implementations, the new kit notification 70 includes a rename kit affordance 80a, a delete kit affordance 80b, a modify kit affordance 80c, a save kit affordance 80d, a share kit affordance 80e, and a publish kit affordance 80f. The rename kit affordance 80a provides an option to rename the new multipede-candy virtual object kit. The delete kit affordance 80b, when selected, deletes the new multipede-candy virtual object kit.

Figure 1H:
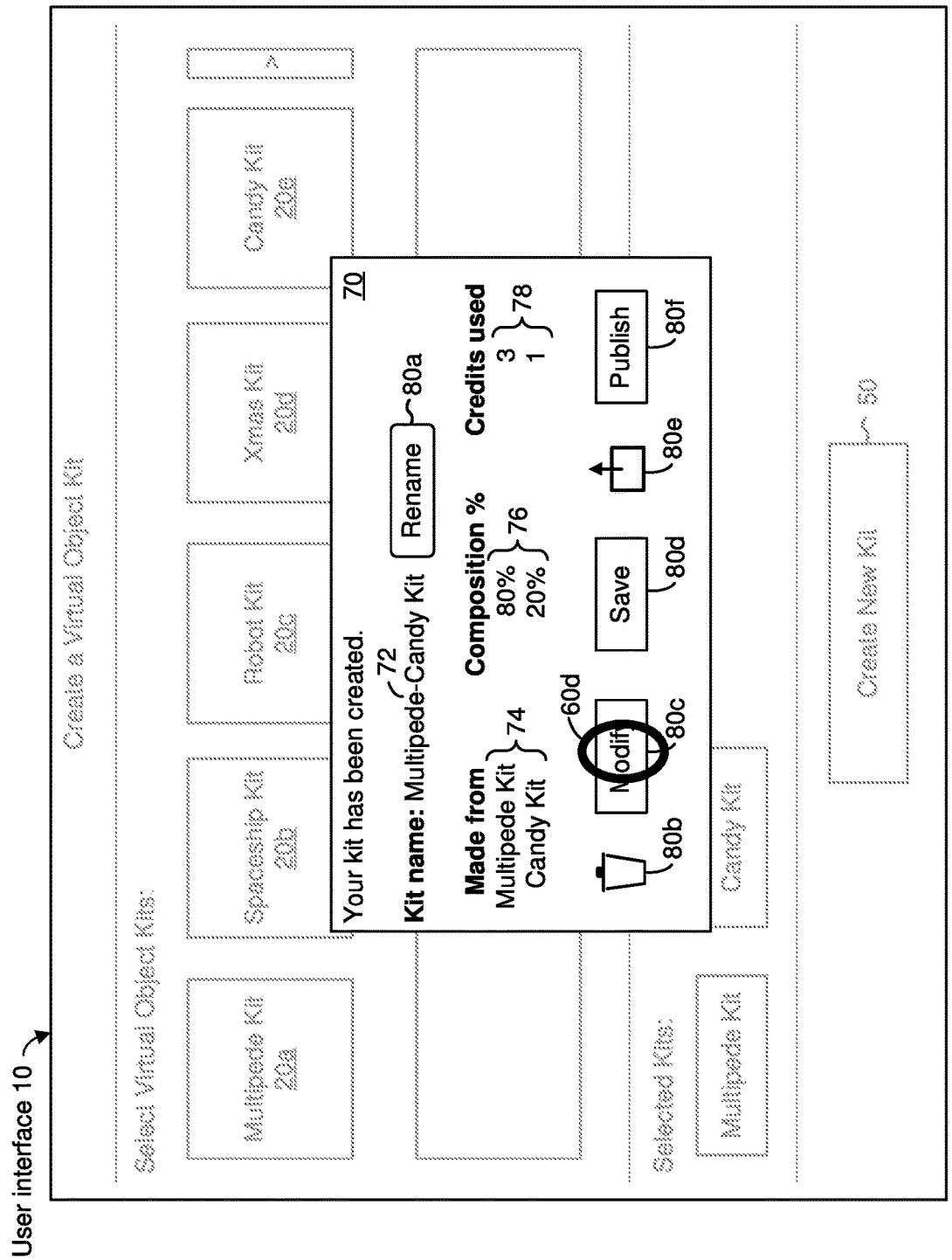

FIG. 1H illustrates a user input 60d selecting the modify kit affordance 80c. In some implementations, the user input 60d corresponds to a request to modify the new multipede-candy virtual object kit.

Figure 1I:
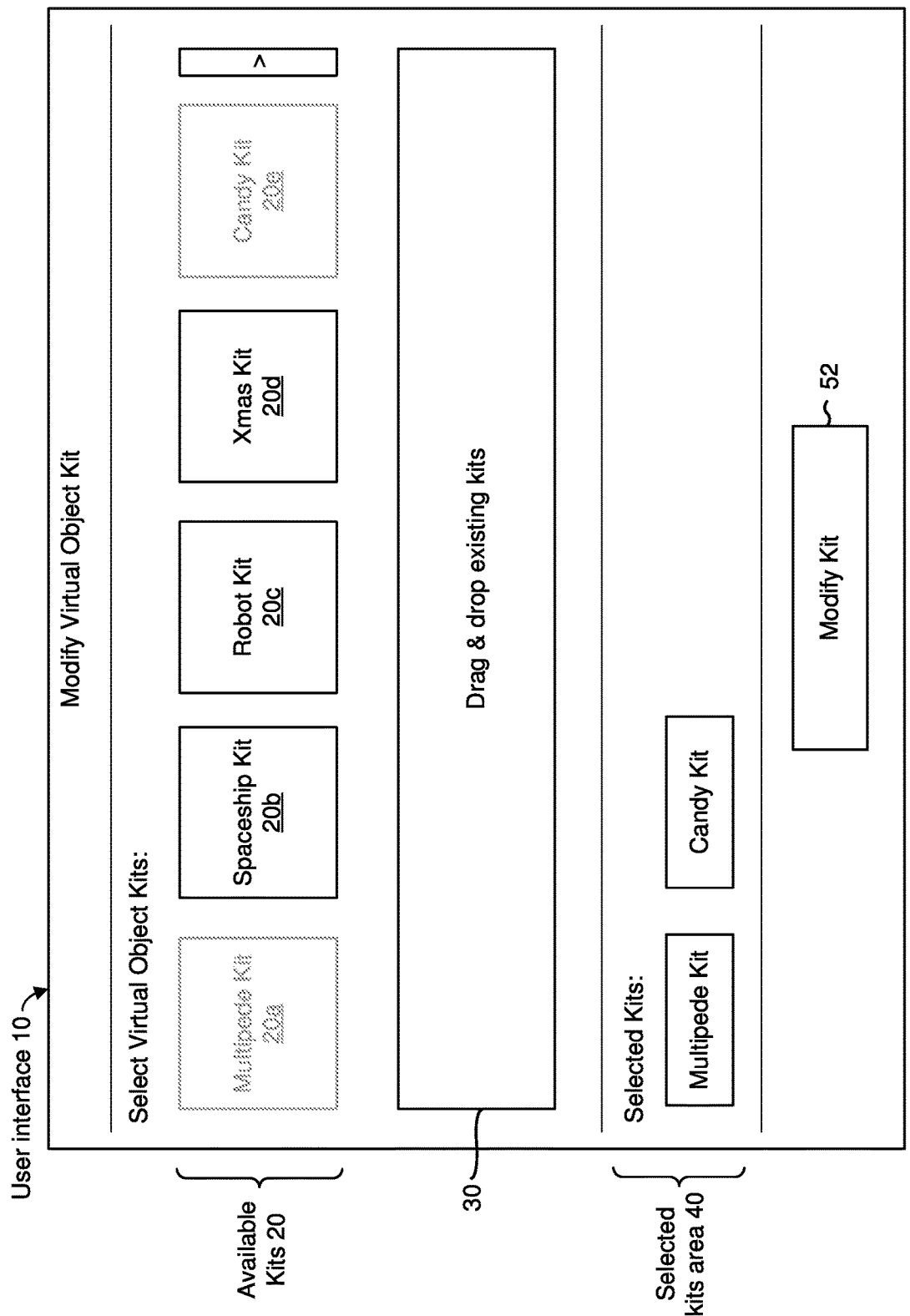

As illustrated in FIG. 1I, in some implementations, in response to receiving the user input 60d shown in FIG. 1H, the user interface 10 provides an option to modify the newly created multipede-candy virtual object kit. In the example of FIG. 1I, the user interface 10 provides an option to remove the multipede virtual object kit (e.g., by left-swiping the representation of the multipede virtual object kit displayed in the selected kits area 40) and/or the candy virtual object kit (e.g., by left-swiping the representation of the candy virtual object kit displayed in the selected kits area 40). The user interface 10 also provides an option to merge additional virtual object kits with the newly created multipede-candy virtual object kit. For example, the user interface 10 provides an option to merge the spaceship virtual object kit with the newly created multipede-candy virtual object kit by selecting the spaceship kit affordance 20b. Similarly, the user interface 10 provides an option to merge the robot virtual object kit with the newly created multipede-candy virtual object kit by selecting the robot kit affordance 20c. In the example of FIG. 1I, the user interface 10 displays a modify kit affordance 52 that, when selected, modifies the newly created multipede-candy virtual object kit. In some implementations, the user interface 10 enables the user to modify virtual object kits that were created within a threshold amount of time prior to a current time (e.g., the user interface 10 enables the user to modify virtual object kits that were created in the last one hour/day/week).

Figure 1J:
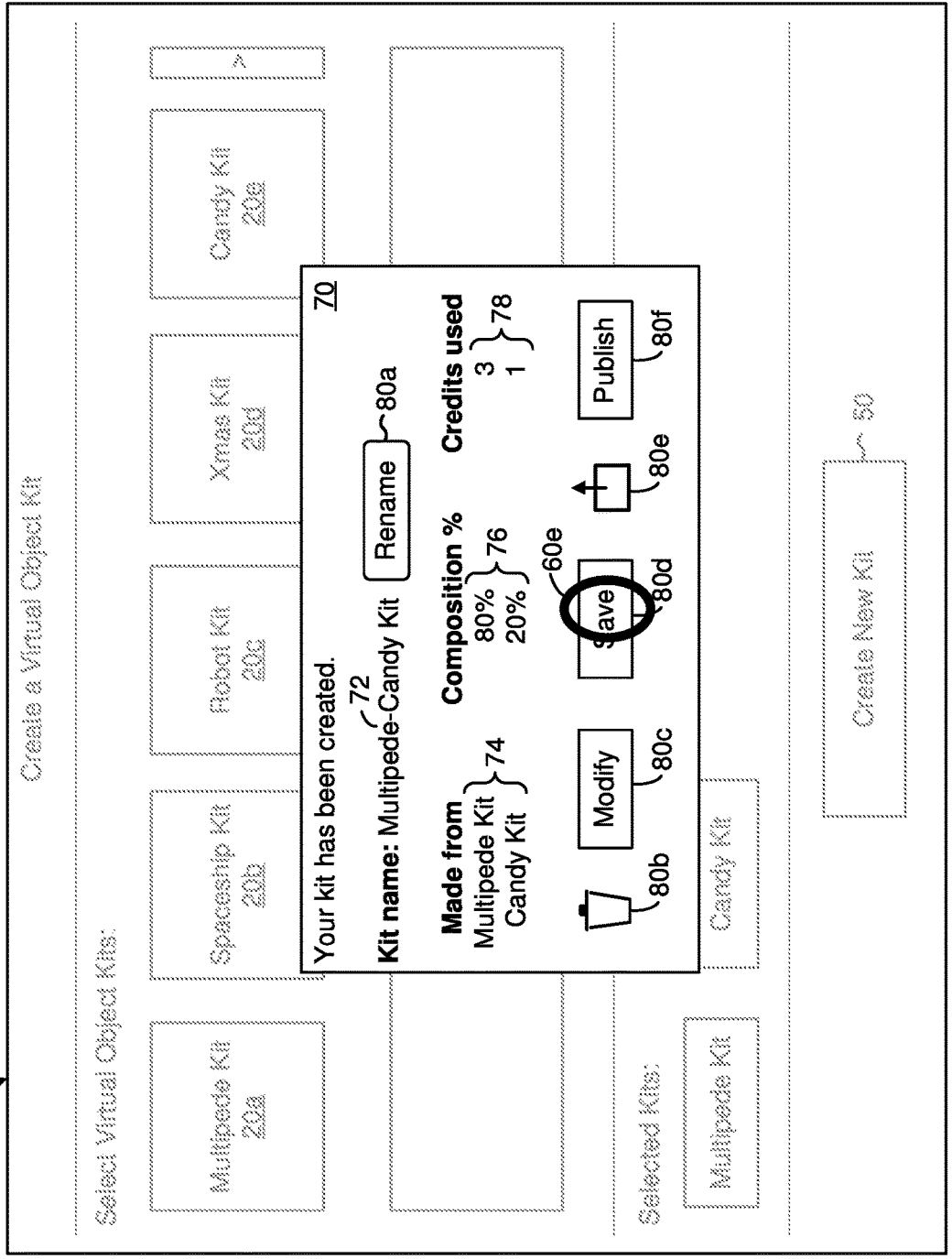

FIG. 1J illustrates a user input 60e selecting the save kit affordance 80d. In some implementations, the user input 60e corresponds to a request to save the newly created multipede-candy virtual object kit.

Figure 1K:
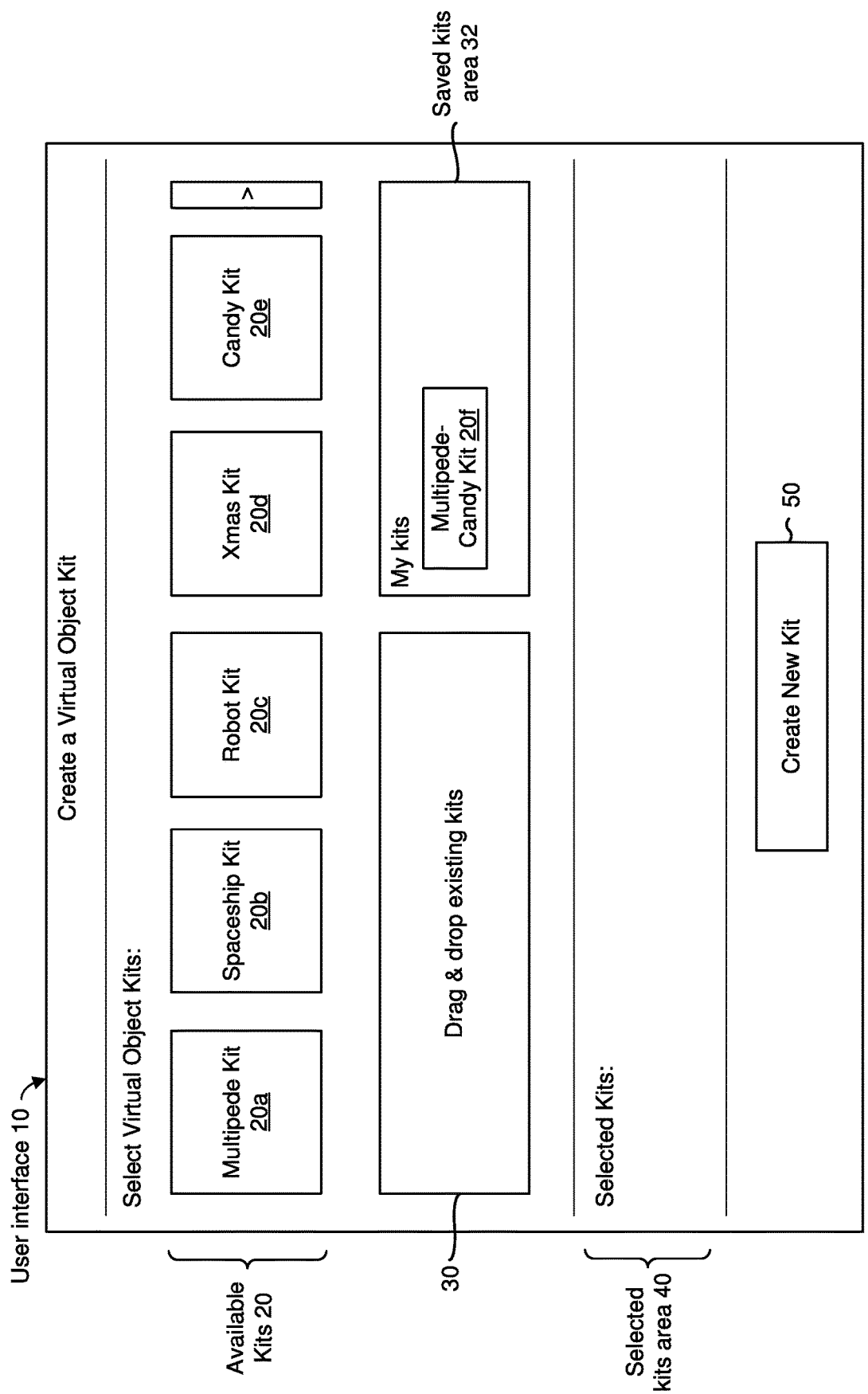

As illustrated in FIG. 1K, in some implementations, in response to receiving the user input 60e shown in FIG. 1J, the user interface 10 displays a saved kits area 32 (e.g., a 'My kits' area). In some implementations, the saved kits area 32 displays representations of virtual object kits that are saved on the device displaying the user interface 10. In some implementations, the saved kits area 32 displays representation of virtual object kits that are associated with an account of a user of the device displaying the user interface 10. For example, in some implementations, the saved kits area 32 displays representations of virtual object kits that the user has purchased from a digital asset store (e.g., a virtual object kit store). In the example of FIG. 1K, the saved kits area 32 displays a multipede-candy affordance 20f representing the multipede-candy virtual object kit. In some implementations, virtual object kits in the saved kits area 32 can be used to form new virtual object kits. As such, the multipede-candy virtual object kit can be used to form other new virtual object kits.

Figure 1L:
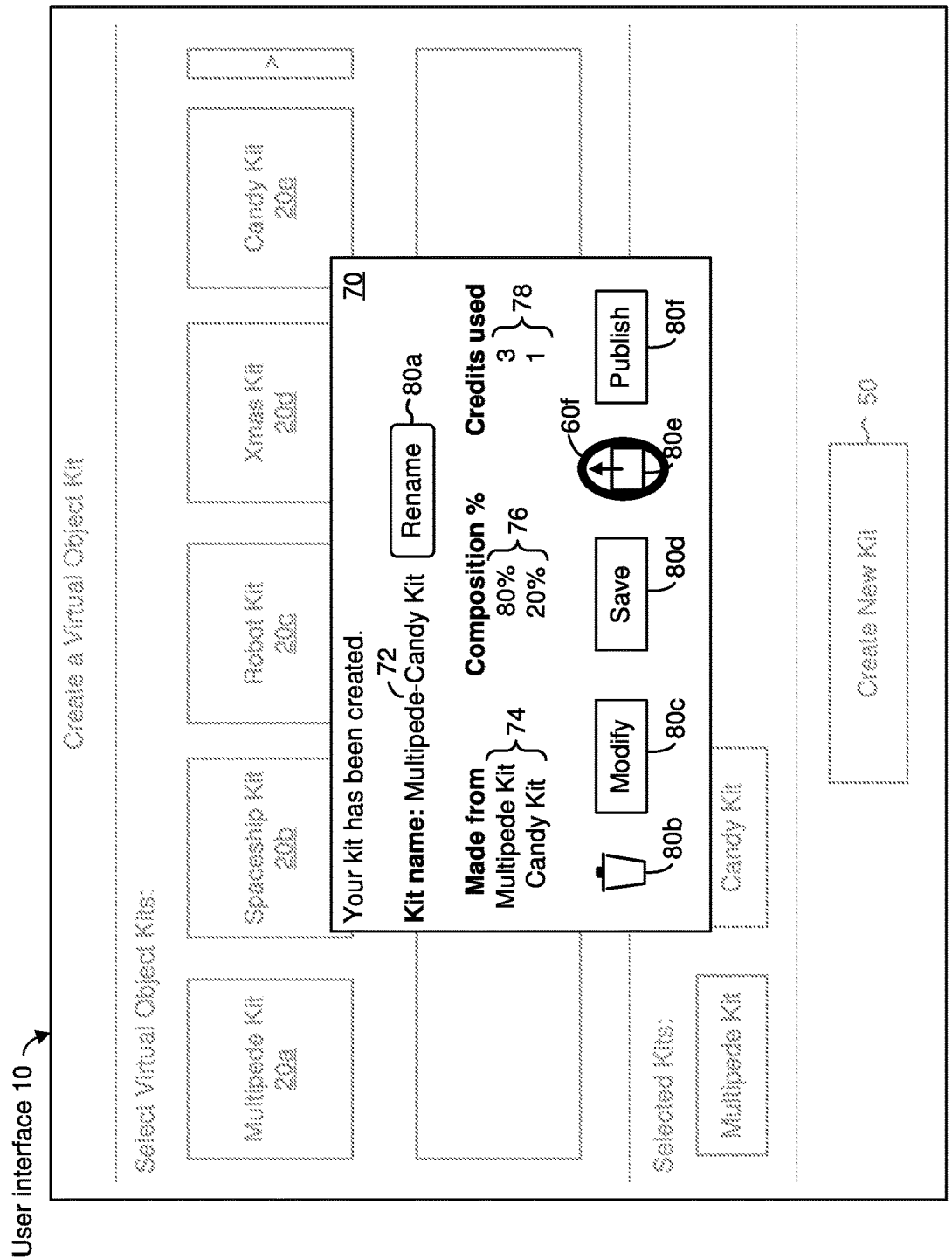

FIG. 1L illustrated a user input 60f selecting the share kit affordance 80e. In some implementations, the user input 60f corresponds to a request to share the newly created multipede-candy virtual object kit.

Figure 1M:
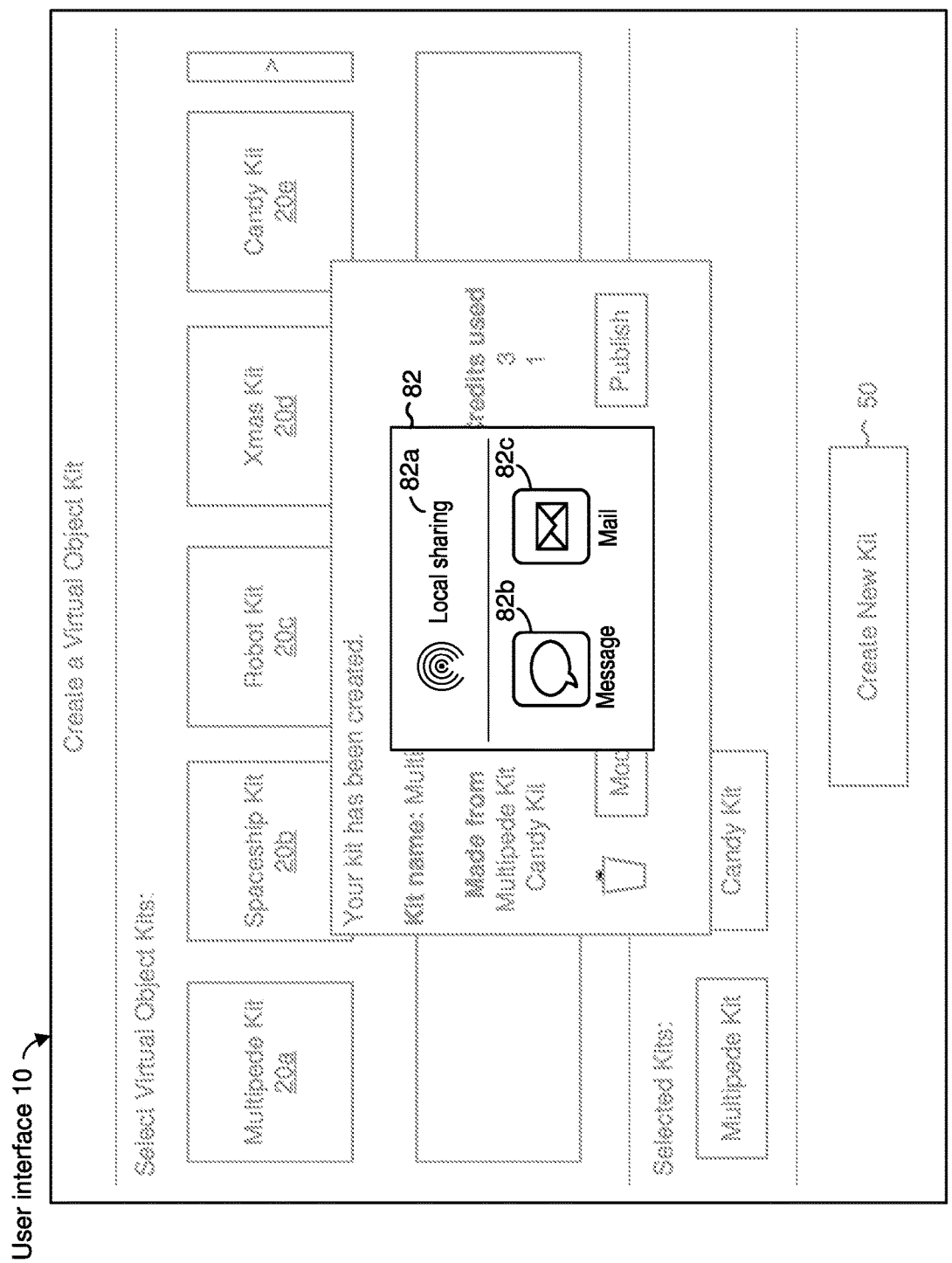

As illustrated in FIG. 1M, in some implementations, in response to receiving the user input 60f shown in FIG. 1L, the user interface 10 displays sharing options 82. In some implementations, the sharing options 82 include a local sharing affordance 82a, a messaging affordance 82b, and a mail affordance 82c. The local sharing affordance 82a, when selected, provides an option to share the newly created multipede-candy virtual object kit with nearby devices. The messaging affordance 82b, when selected, provides an option to share the newly created multipede-candy virtual object kit via an instant message. The mail affordance 82c, when selected, provides an option to share the newly created multipede-candy virtual object kit via e-mail.

Figure 1N:
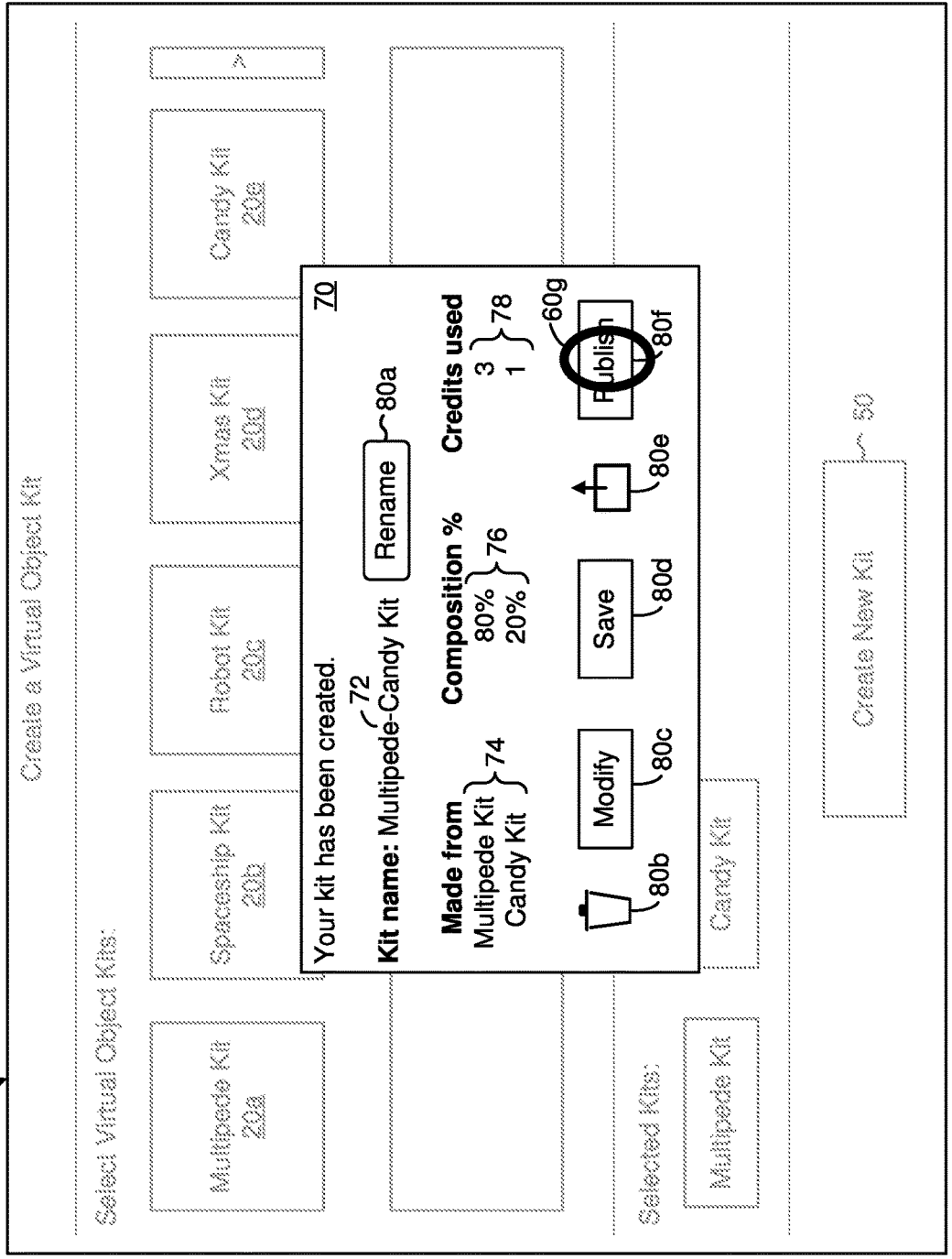
Figure 10:
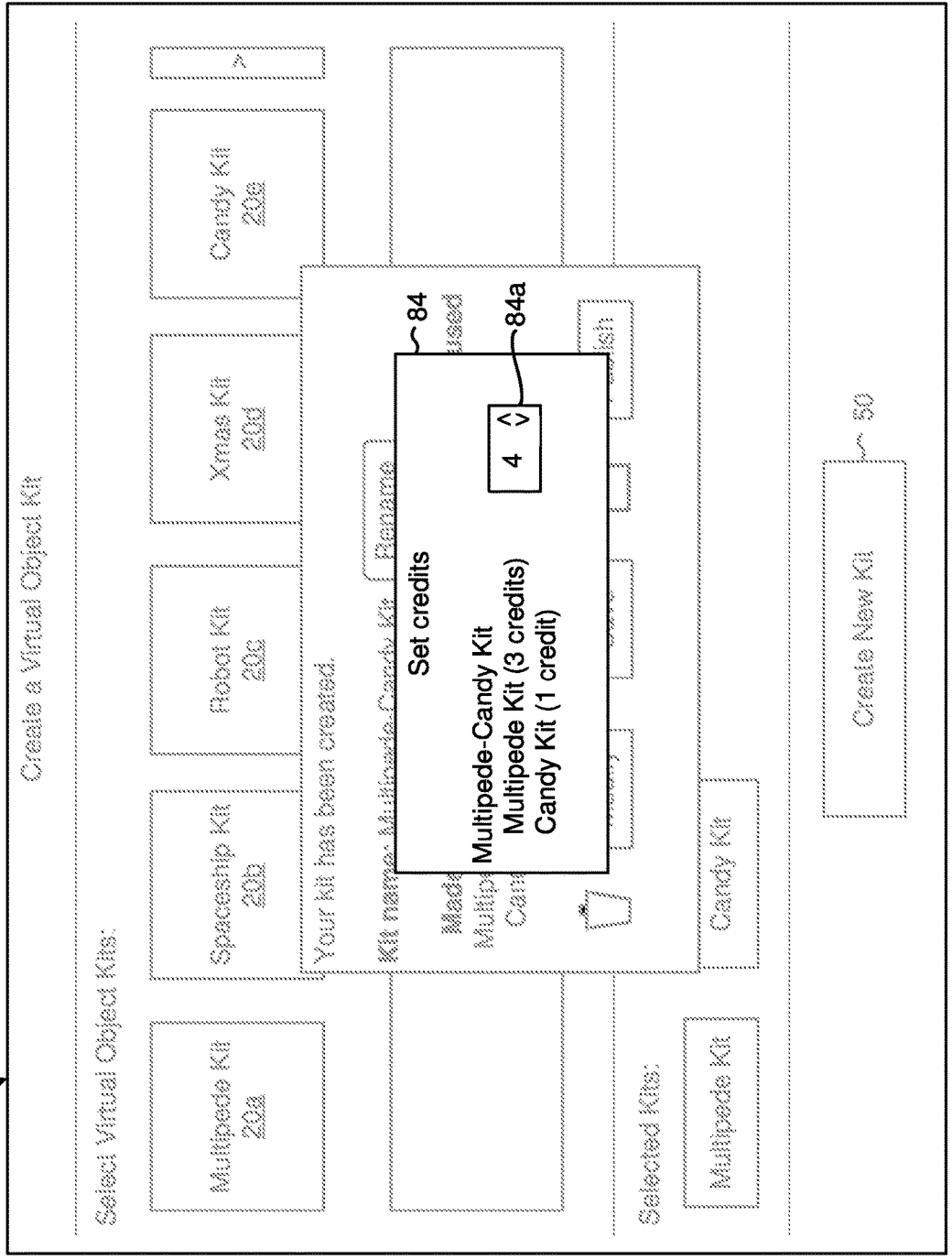

FIG. 1N illustrates a user input 60g selecting the publish kit affordance 80f. In some implementations, the user input 60g corresponds to a request to publish (e.g., distribute) the newly created multipede-candy virtual object kit. In some implementations, the user input 60g corresponds to a request to make the newly created multipede-candy virtual object kit available to other users through the digital asset store (e.g., the virtual object store). In some implementations, publishing the multipede-candy virtual object kit enables other users to create virtual objects from the multipede-candy virtual object kit. In some implementations, publishing the multipede-candy virtual object kit enables other users to merge the multipede-candy virtual object kit with other virtual object kits in order to create other new virtual object kits.

As illustrated in FIG. 1O, in some implementations, in response to receiving the user input 60g shown in FIG. 1N, the user interface 10 displays publishing options 84. In some implementations, the publishing options 84 include a credit selection field 84a that enables the user to select an amount of credits associated with the multipede-candy virtual object kit. In some implementations, the user receives the amount of credits specified in the credit selection field 84a when the multipede-candy virtual object kit is used to form other new virtual object kits. In some implementations, a default value of the credit selection field 84a is a sum of the credits used 78 (shown in FIG. 1L) to create the multipede-candy virtual object kit. In some implementations, a minimum value that the credit selection field 84a accepts is the credits used 78 to create the multipede-candy virtual object kit. In some implementations, a number of credits that the creator of the multipede-candy virtual object kit receives when the multipede-candy virtual object kit is used to create other new virtual object kits is equal to a difference between a value of the credit selection field 84a and the credits used 78 (shown in FIG. 1L).

Figure 1P:
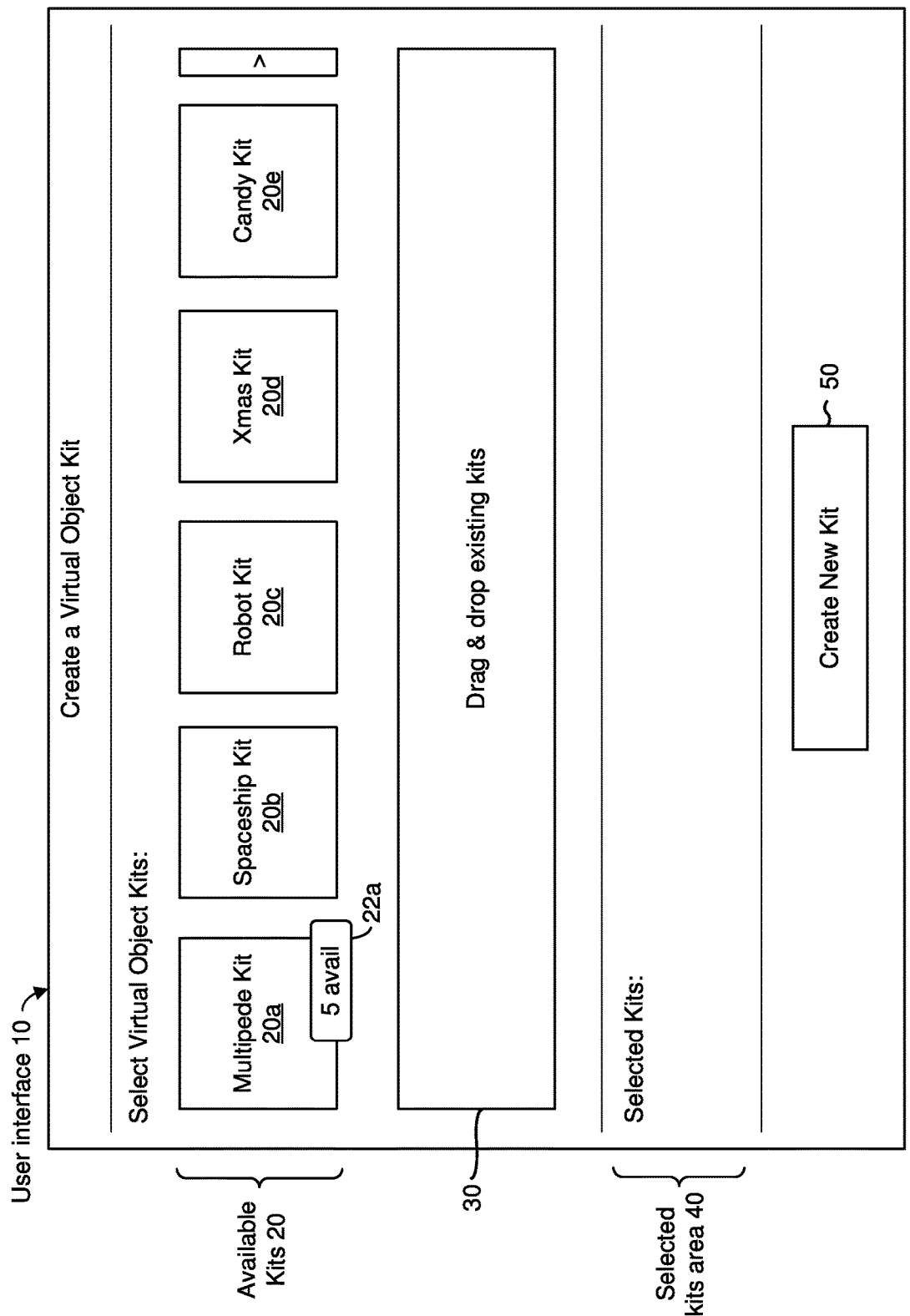

Referring to FIG. 1P, in some implementations, the multipede kit affordance 20a is associated with an availability indicator 22a that indicates a number of instances of the multipede virtual object kit that are available. In the example of FIG. 1P, the availability indicator 22a has a value of five. As such, in the example of FIG. 1P, there are five instances of the multipede virtual object kit available for use.

Figure 1Q:
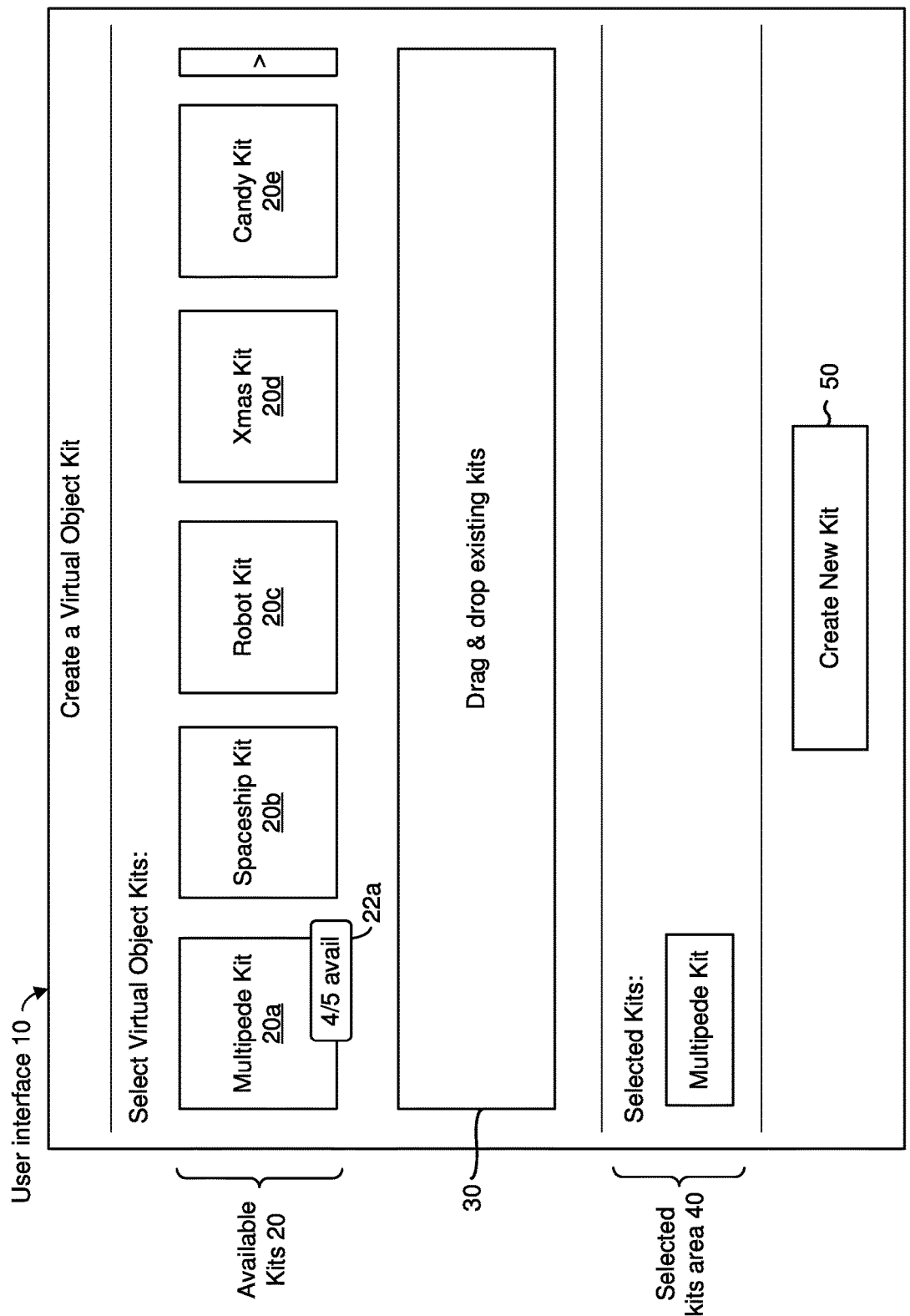

In FIG. 1Q, a representation of the multipede virtual object kit is displayed in the selected kits area 40 indicating that an instance of the multipede virtual object kit has been selected to form a new virtual object kit. Since an instance of the multipede virtual object kit was used or is about to be used, the user interface 10 updates the availability indicator 22a to indicate that four of the five instances of the multipede virtual object kit are still available for use. More generally, in various implementations, the user interface 10 decrements a value of the availability indicator 22a in response to a selection of the multipede kit affordance 20a.

Figure 1R:
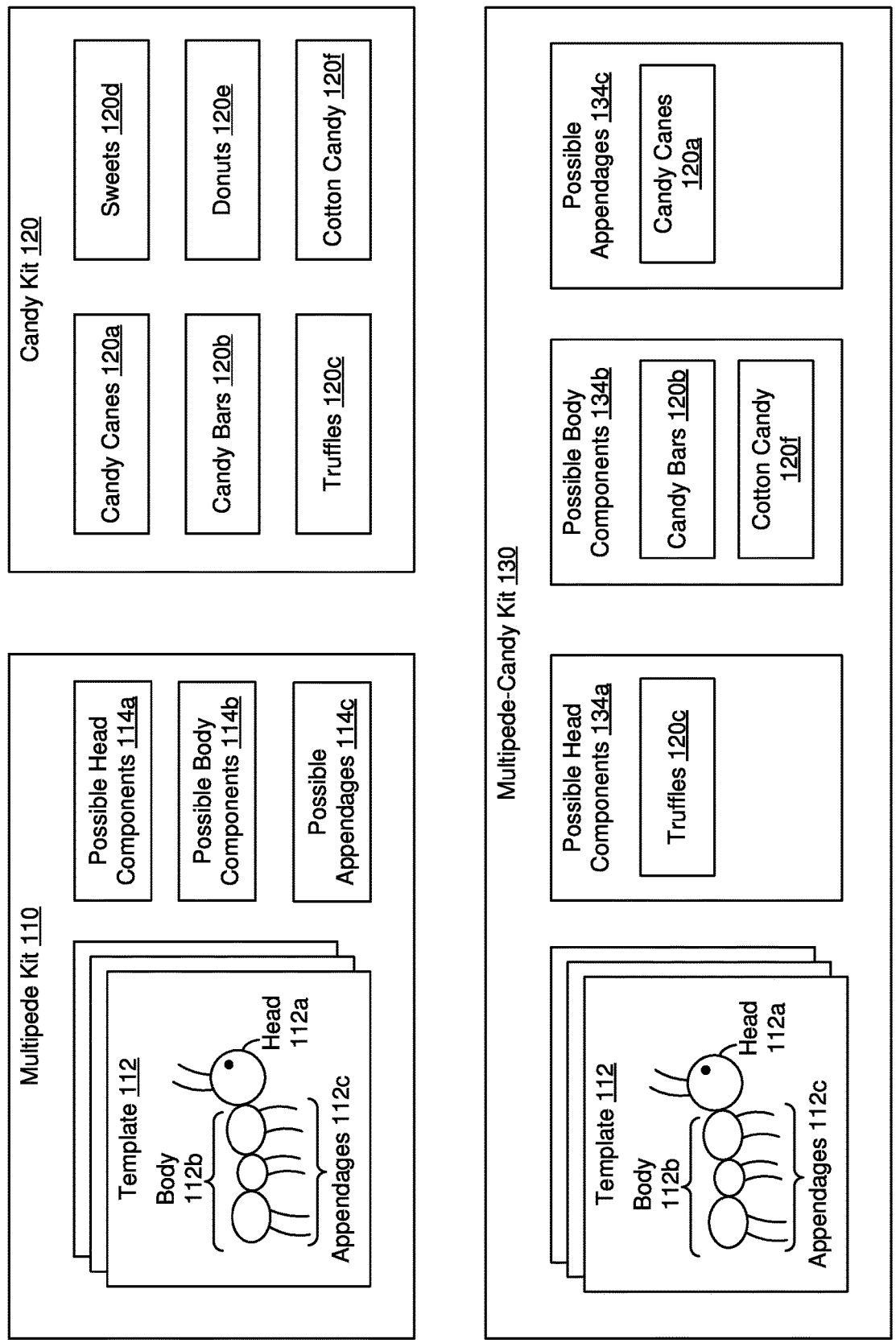

FIG. 1R illustrates a multipede virtual object kit 110, a candy virtual object kit 120, and a multipede-candy virtual object kit 130. In the example of FIG. 1R, the multipede-candy virtual object kit 130 is synthesized by merging the multipede virtual object kit 110 and the candy virtual object kit 120.

As shown in FIG. 1R, the multipede virtual object kit 110 includes one or more templates 112 for building a multipede virtual object. In the example of FIG. 1R, the template 112 is for synthesizing a multipede virtual object that includes a head 112a, a body 112b and appendages 112c. The multipede virtual object kit 110 also includes possible head components 114a (e.g., a teapot, a soccer ball and/or a watermelon (not shown)) for the head 112a, possible body components 114b (e.g., a burrito (not shown)) for the body 112b, and possible appendages 114c (e.g., twigs and/or fries (not shown)) for the appendages 112c.

In the example of FIG. 1R, the candy virtual object kit 120 includes candy canes 120a, candy bars 120b, truffles 120c, sweets 120d, donuts 120e, and cotton candy 120f. In some implementations, the candy virtual object kit 120 includes templates (not shown) for creating edible virtual objects using the candy canes 120a, the candy bars 120b, the truffles 120c, the sweets 120d, the donuts 120e, and the cotton candy 120f.

In the example of FIG. 1R, the multipede-candy virtual object kit 130 includes at least some of the one or more templates 112 from the multipede virtual object kit 110. As shown in FIG. 1R, the multipede-candy virtual object kit 130 includes possible head components 134a for the head 112a, possible body components 134b for the body 112, and possible appendages for the appendages 112c.

As illustrated in FIG. 1R, the possible head components 134a of the multipede-candy virtual object kit 130 include some components from the candy virtual object kit 120. For example, the possible head components 134a include truffles 120c from the candy virtual object kit 120. In some implementations, the possible head components 134a in the multipede-candy virtual object kit 130 are different from the possible head components 114a in the multipede virtual object kit 110. For example, unlike the possible head components 114a of the multipede virtual object kit 110, the possible head components 134a of the multipede-candy virtual object kit 130 do not include a teapot, a soccer ball and/or a watermelon.

As illustrated in FIG. 1R, the possible body components 134b of the multipede-candy virtual object kit 130 include some components from the candy virtual object kit 120. For example, the possible body components 134b include candy bars 120b and cotton candy 120f from the candy virtual object kit 120. In some implementations, the possible body components 134b in the multipede-candy virtual object kit 130 are different from the possible body components 114b in the multipede virtual object kit 110. For example, unlike the possible body components 114b of the multipede virtual object kit 110, the possible body components 134b of the multipede-candy virtual object kit 130 do not include a burrito.

As illustrated in FIG. 1R, the possible appendages 134c of the multipede-candy virtual object kit 130 include some components from the candy virtual object kit 120. For example, the possible appendages 134c include candy canes 120a from the candy virtual object kit 120. In some implementations, the possible appendages 134c in the multipede-candy virtual object kit 130 are different from the possible appendages 114c in the multipede virtual object kit 110. For example, unlike the possible appendages 114c of the multipede virtual object kit 110, the possible appendages 134c of the multipede-candy virtual object kit 130 do not twigs and/or fries.

As shown in FIG. 1R, the multipede-candy virtual object kit 130 includes templates 112 from the multipede virtual object kit 110, and components from the candy virtual object kit 120 that are compatible with the templates 112. More generally, in various implementations, a new virtual object kit includes templates from a first existing virtual object kit and components that are compatible with the templates from a second existing virtual object kit.

FIG. 1S illustrates the multipede virtual object kit 110, a tree virtual object kit 140 and a multipede-tree virtual object kit 150. In the example of FIG. 1S, the multipede-tree virtual object kit 150 is synthesized by merging the multipede virtual object kit 110 and the tree virtual object kit 140.

As shown in FIG. 1S, the tree virtual object kit 140 includes one or more templates 142 for building a tree virtual object. In the example of FIG. 1S, the template 142 is for synthesizing a tree virtual object that includes a trunk 142a, branches 142b, and leaves 142c. The tree virtual object kit 140 also includes possible trunk components 144a (e.g., a flag pole, a baseball bat and/or a 2×4 piece of wood (not shown)) for the trunk 142a, possible branch components 144b (e.g., a gold club (not shown) for the branches 142b), and possible leaf components 144c (e.g., paper plates (not shown) for the leaves 142c).

In the example of FIG. 1S, the multipede-tree virtual object kit 150 includes one or more templates 152 for synthesizing a multipede-tree virtual object that is different from a multipede virtual object and a tree virtual object. For example, as illustrated by the template 152, a multipede-tree virtual object includes the trunk 142a from the template 142 of the tree virtual object kit 140, and tentacles 154b that are neither in the tree virtual object kit 140 nor in the multipede virtual object kit 110. More generally, in some implementations, a merged virtual object kit includes a template with portions that are not found in any of the existing virtual object kits that were used to create the merged virtual object kit.

As illustrated in FIG. 1S, the multipede-tree virtual object kit 150 includes possible trunk components 154a for the trunk 142a in the template 152, and possible tentacle components 154b for the tentacles 154b in the template 152.

In the example of FIG. 1S, the possible trunk components 154a include at least some of the possible body components 114b from the multipede virtual object kit 110 (e.g., the possible trunk components 154a include a burrito). In some implementations, the possible trunk components 154a of the multipede-tree virtual object kit 150 are different from the possible trunk components 144a of the tree virtual object kit 140 (e.g., unlike the possible trunk components 144a of the tree virtual object kit 140, the possible trunk components 154a of the multipede-tree virtual object kit 150 do not include a flag pole, a baseball bat and/or a 2×4 piece of wood). However, in some implementations, the possible trunk components 154a of the multipede-tree virtual object kit 150 include at least some of the possible trunk components 144a from the tree virtual object kit 140.

As illustrated in FIG. 1S, the possible tentacle components 154b include at least some of the possible appendages 114c from the multipede virtual object kit 110 (e.g., the possible tentacle components 154b include fries).

As shown in FIG. 1S, the multipede-tree virtual object kit 150 includes templates 152 that are different from the templates 112 of the multipede virtual object kit 110 and the templates 142 of the tree virtual object kit 140. More generally, in various implementations, a merged virtual object kit includes templates that are different from the templates of the existing virtual object kits that were merged to create the merged virtual object kit.

In some implementations, a virtual object kit enables a user to create (e.g., synthesize or generate) virtual objects of a virtual object type associated with the virtual object kit. In various implementations, allowing a user to create a new virtual object kit enables the user to synthesize virtual objects that are of a new virtual object type associated with the new virtual object kit.

In various implementations, a virtual object represents a character or a variation thereof from fictional material such as a movie, a video game, a comic, and/or a novel. In various implementations, a virtual object represent things (e.g., tangible objects). For example, in some implementations, a virtual object represents equipment (e.g., machinery such as planes, tanks, robots, cars, etc.). In some implementations, a virtual object represents things (e.g., equipment) from fictional material. In some implementations, a virtual object represent a thing from the real-world.

In various implementations, a virtual object performs an action in order to satisfy (e.g., complete or achieve) an objective. In some implementations, a virtual object is associated with a particular objective, and the virtual object performs actions that improve the likelihood of satisfying that particular objective. In some implementations, the virtual objects are referred to as object representations, for example, because the virtual objects represent various objects (e.g., real-world objects, or fictional objects).

In some implementations, a virtual object representing a character is referred to as a character virtual object. In some implementations, a character virtual object performs actions in order to advance a character objective. In some implementations, a virtual object kit that synthesizes character virtual objects is referred to as a character virtual object kit.

In some implementations, a virtual object representing an equipment is referred to as an equipment virtual object. In some implementations, an equipment virtual object performs actions in order to advance an equipment objective. In some implementations, a virtual object kit that synthesizes equipment virtual objects is referred to as an equipment virtual object kit.

In some implementations, a virtual object representing an environment is referred to as an environmental virtual object. In some implementations, an environmental virtual object performs environmental actions in order to advance an environmental objective. In some implementations, a virtual object kit that synthesizes environmental virtual objects is referred to as an environmental virtual object kit.

Figure 2A:
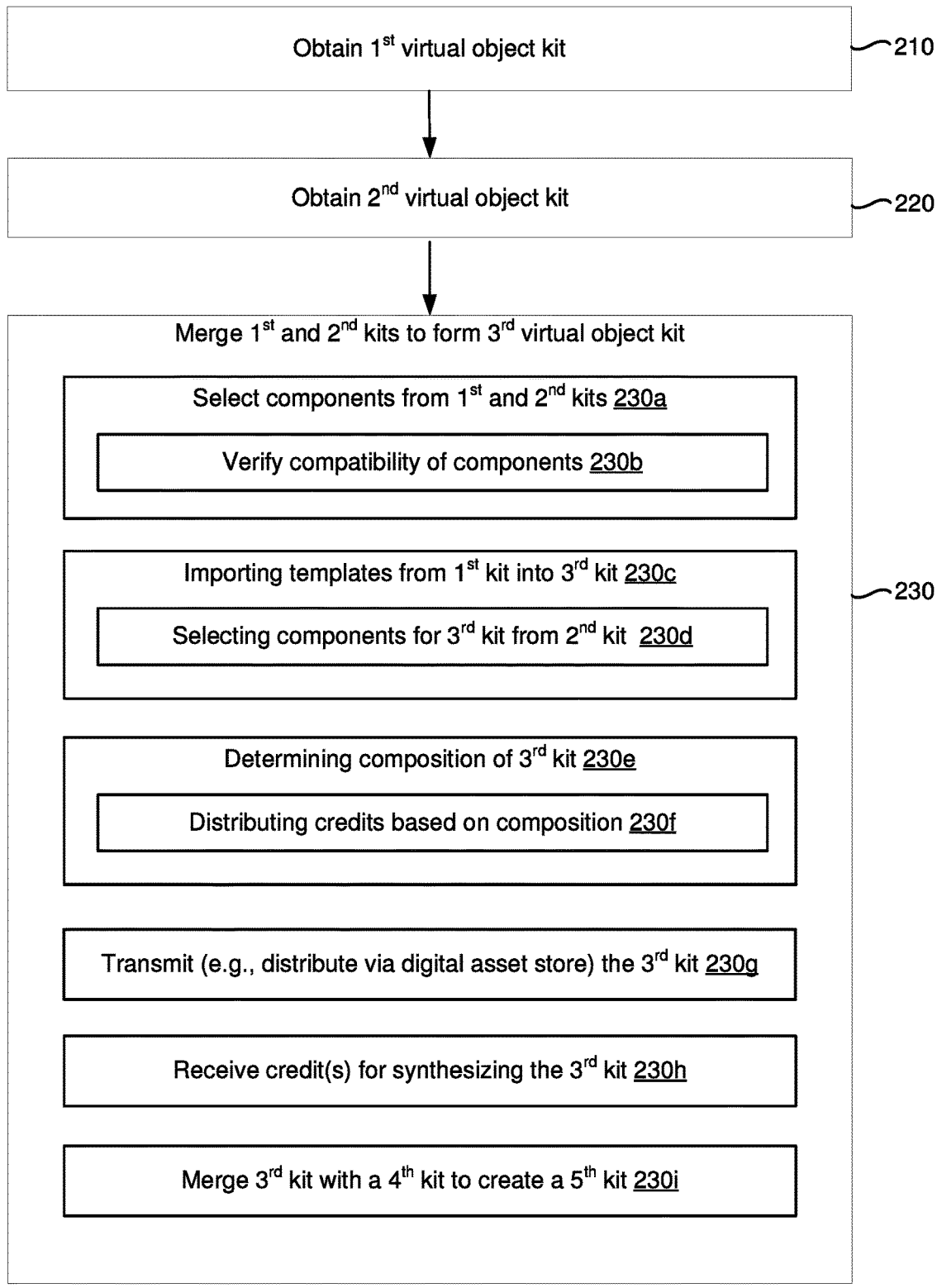

FIG. 2A is a flowchart representation of a method 200 of merging virtual object kits to form a new virtual object kit. In various implementations, the method 200 is performed by a device with a display, a non-transitory memory, and one or more processors coupled with the display and the non-transitory memory. In some implementations, the method 200 is performed by processing logic, including hardware, firmware, software, or a combination thereof. In some implementations, the method 200 is performed by a processor executing code stored in a non-transitory computer-readable medium (e.g., a memory). Briefly, in some implementations, the method 200 includes obtaining a first virtual object kit, obtaining a second virtual object kit, and merging the first virtual object kit and the second virtual object kit in order to form a third virtual object kit.

As represented by block 210, in some implementations, the method 200 includes obtaining a first virtual object kit that corresponds to a first virtual object type (e.g., obtaining the multipede virtual object kit represented by the multipede kit affordance 20a shown in FIG. 1A). In some implementations, the method 200 includes receiving the first virtual object kit from a digital asset store (e.g., a virtual object kit store) where a first entity (e.g., a creator of the first virtual object kit) uploaded the first virtual object kit.

As represented by block 220, in some implementations, the method 200 includes obtaining a second virtual object kit that corresponds to a second virtual object type that is different from the first virtual object type (e.g., obtaining the spaceship virtual object kit represented by the spaceship kit affordance 20b shown in FIG. 1A). In some implementations, the method 200 includes receiving the second virtual object kit from a digital asset store (e.g., a virtual object kit store) where a second entity (e.g., a creator of the second virtual object kit) uploaded the second virtual object kit.

In some implementations, virtual objects of the first virtual object type are associated with a first set of objectives and a first set of actions that, when performed by the virtual objects of the first virtual object type, satisfy the first set of objectives. In some implementations, virtual objects of the second virtual object type are associated with a second set of objectives and a second set of actions that, when performed by the virtual objects of the second virtual object type, satisfy the second set of objectives. In some implementations, the second set of objectives are different from the first set of objectives, and the second set of actions are different from the first set of actions.

As represented by block 230, in some implementations, the method 200 includes merging the first virtual object kit and the second virtual object kit in order to form a third virtual object kit (e.g., as shown in FIG. 1S, the multipede virtual object kit 110 and the tree virtual object kit 140 are merged to form the multipede-tree virtual object kit 150). In some implementations, the third virtual object kit includes a set of virtual object templates of a third virtual object type (e.g., as shown in FIG. 1S, the multipede-tree virtual object kit 150 includes one or more templates 152 of a multipede-tree virtual object type). In some implementations, the third virtual object type is different from the first virtual object type and the second virtual object type (e.g., as shown in FIG. 1S, the multipede-tree virtual object type is different from the multipede virtual object type and the tree virtual object type). In some implementations, the third virtual object kit includes a plurality of groups of components associated with respective portions of a virtual object (e.g., as shown in FIG. 1S, the multipede-tree virtual object kit 150 includes the possible trunk components 154a associated with the trunk 142a portion of a multipede-tree virtual object, and the possible tentacle components 154b associated with the tentacles 154b portion of the multipede-tree virtual object). In various implementations, merging the first and second virtual object kits enables the creation of a new virtual object kit that can be used by a user to create a new type of virtual object thereby enhancing the functionality of the device.

As represented by block 230a, in some implementations, the method 200 includes selecting a first portion of the plurality of groups of components from the first virtual object kit, and selecting a second portion of the plurality of groups of components from the second virtual object kit (e.g., as shown in FIG. 1S, the possible trunk components 154a of the multipede-tree virtual object kit 150 include at least some of the possible body components 114b from the multipede virtual object kit 110 and at least some of the possible trunk components 144a from the tree virtual object kit 140). Selecting components from the first and second virtual object kits saves the user time by not requiring the user to create new components for the third virtual object kit from scratch. Saving the user time results in fewer user interactions with the device thereby extending the battery life of the device and/or reducing wear-and-tear of the device.

As represented by block 230b, in some implementations, the method 200 includes verifying that the first portion of the plurality of groups of components are compatible with the second portion of the plurality of groups of components. Verifying compatibility of components ensures that the third virtual object kit does not include incompatible components that cannot be combined to create virtual objects.

As represented by block 230c, in some implementations, the method 200 includes importing at least a portion of the set of virtual object templates from the first virtual object kit into the third virtual object kit (e.g., as shown in FIG. 1R, the multipede-candy virtual object kit 130 includes the templates 112 from the multipede virtual object kit 110). Importing templates from the first virtual object kit into the third virtual object kit saves the user time by not requiring the user to create new virtual object templates from scratch. Saving the user time results in fewer user interactions with the device thereby extending the battery life of the device and/or reducing wear-and-tear of the device.

As represented by block 230d, in some implementations, the method 200 includes selecting a portion of the plurality of groups of components from the second virtual object kit (e.g., as shown in FIG. 1R, the possible head components 134a of the multipede-candy virtual object kit 130 includes truffles 120c from the candy virtual object kit 120). As such, in some implementations, the method 200 enables a user to select a virtual object template from one virtual object kit and populate that virtual object template with components from another virtual object kit.

As represented by block 230e, in some implementations, the method 200 includes determining that a first portion (e.g., a first percentage) of the third virtual object kit is made from the first virtual object kit, and determining that a second portion (e.g., a second percentage) of the third virtual object kit is made from the second virtual object kit (e.g., as shown in FIG. 1G, the new kit notification 70 displays the composition percentages 76).

As represented by block 230f, in some implementations, the method 200 includes distributing, based on the first portion, a first amount of credits to a first entity that created the first virtual object kit, and distributing, based on the second portion, a second amount of credits to a second entity that created the second virtual object kit (e.g., as shown in FIG. 1G, three credits are distributed to a creator/owner of the multipede virtual object kit and one credit is distributed to a creator/owner of the candy virtual object kit).

As represented by block 230g, in some implementations, the method 200 includes transmitting (e.g., distributing or publishing) the third virtual object kit (e.g., so that other users can use the third virtual object kit to create additional virtual object kits). In some implementations, the method 200 includes distributing (e.g., publishing or uploading) the third virtual object kit via a digital asset store (e.g., a virtual object kit store).

As represented by block 230h, in some implementations, the method 200 includes receiving one or more credits for synthesizing the third virtual object kit. In some implementations, the method 200 includes receiving a credit in response to the third virtual object kit being used to synthesize a virtual object of the third virtual object type. In some implementations, the method 200 includes receiving a credit in response to the third virtual object kit being merged with a fourth virtual object kit in order to form a fifth virtual object kit. In some implementations, an amount of credits is established by the user (e.g., via the credit selection field 84a shown in FIG. 1O).

As represented by block 230i, in some implementations, the method 200 includes merging the third virtual object kit with a fourth virtual object kit in order to form a fifth virtual object kit. In some implementations, after merging the first virtual object kit and the second virtual object kit in order to form the third virtual object kit, the method 200 includes obtaining a fourth virtual object kit that corresponds to a fourth virtual object type, and merging the third virtual object kit with the fourth virtual object kit in order to form a modified third virtual object kit (e.g., as illustrated in FIG. 1I, the multipede-candy virtual object kit can be modified).

In some implementations, merging the third virtual object kit with the fourth virtual object kit includes adding a virtual object template from the fourth virtual object kit to the set of virtual object templates in the third virtual object kit.

In some implementations, merging the third virtual object kit with the fourth virtual object kit includes adding one or more components from the fourth virtual object kit to the plurality of groups of components in the third virtual object kit.

Referring to FIG. 2B, as represented by block 230j, in some implementations, the method 200 includes merging the first virtual object kit and the second virtual object kit based on a merge criterion. In some implementations, the method 200 includes, prior to merging the first virtual object kit and the second virtual object kit, determining whether the first virtual object kit and the second virtual object kit satisfy a merge criterion. In some implementations, in response to determining that the merge criterion is satisfied, the method 200 includes merging the first virtual object kit with the second virtual object kit. In some implementations, in response to determining that the merge criterion is not satisfied, the method 200 includes displaying a prompt indicating that the first virtual object kit and the second virtual object kit cannot be merged.

In some implementations, the method 200 includes determining whether components from the first virtual object kit are compatible with a template from the second virtual object kit. In some implementations, the method 200 includes determining whether components from the first virtual object kit can be used to populate a template in the second virtual object kit.

As represented by block 230k, in some implementations, the third virtual object kit includes a construction kit that defines physical form of virtual objects. For example, the third virtual object kit defines what the virtual object looks like. In some implementations, the third virtual object kit includes an animation kit that defines responses of virtual objects. For example, the third virtual object kit defines what actions the virtual object performs and/or how the virtual object performs actions. In some implementations, the third virtual object kit includes a behavioral kit that defines responses to stimuli. For example, the third virtual object kit defines how virtual objects interact with other virtual objects.

As represented by block 230*l*, in some implementations, the method 200 includes determining an availability of the first virtual object kit and/or the second virtual object kit. In some implementations, the method 200 includes prior to merging the first virtual object kit and the second virtual object kit, determining whether a number of available instances of the first virtual object kit is greater than zero. In some implementations, in response to determining that the number of available instances of the first virtual object kit is greater than zero, the method 200 includes merging the first virtual object kit with the second virtual object kit, and decrementing the number of available instances of the first virtual object kit (e.g., as shown in FIGS. 1P-1Q, a value of the availability indicator 22*a* is decremented).

As represented by block 230*m*, in some implementations, at least one of the plurality of groups of components in the third virtual object kit includes accessories for the virtual object (e.g., hats, sunglasses, etc.). In some implementations, at least one of the plurality of groups of components includes augmentation components for the virtual object (e.g., color, texture, materials, skin, etc.). In some implementations, obtaining the first virtual object kit includes obtaining a virtual object supplemental kit that includes supplemental components to supplement the virtual object (e.g., the first virtual object kit is a dedicated accessories kit).

As represented by block 240, in some implementations, the method 200 includes building (e.g., synthesizing or assembling) a virtual object using the third virtual object kit. As represented by block 240*a*, in some implementations, the method 200 includes receiving a request to assemble a virtual object. In some implementations, the request includes a selection of components from at least some of the plurality of groups of components. As represented by block 240*b*, in some implementations, the method 200 includes synthesizing the virtual object in accordance with the request. As represented by block 240*c*, in some implementations, the method 200 includes instantiating the virtual object in a CGR environment (e.g., in one of an augmented reality (AR) environment and a virtual reality (VR) environment).

Figure 3:
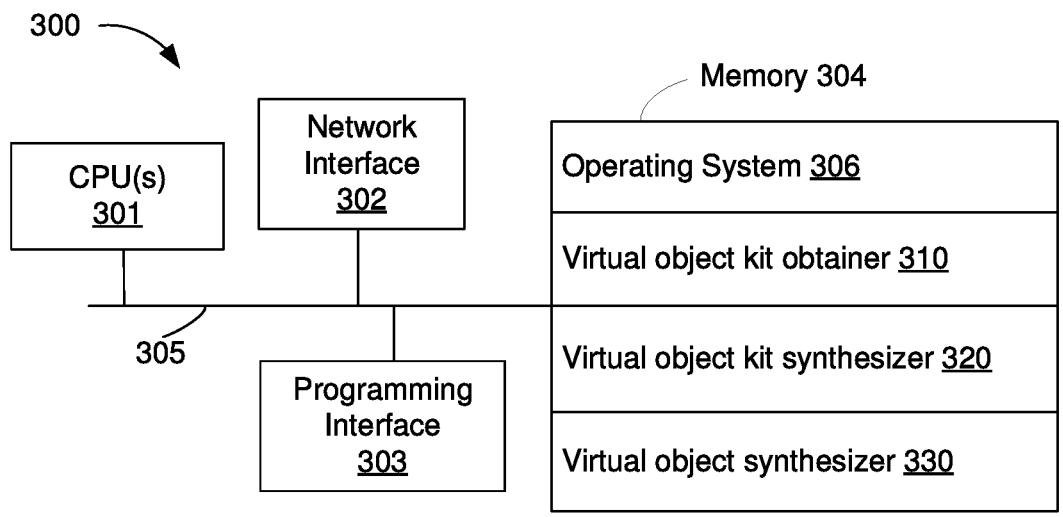
FIG. 3 is a block diagram of a server system that merges virtual object kits in accordance with some implementations.

FIG. 3 is a block diagram of a server system 300 enabled with one or more components of a device in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 300 includes one or more processing units (CPUs) 301, a network interface 302, a programming interface 303, a memory 304, and one or more communication buses 305 for interconnecting these and various other components.

In some implementations, the network interface 302 is provided to, among other uses, establish and maintain a metadata tunnel between a cloud hosted network management system and at least one private network including one or more compliant devices. In some implementations, the communication buses 305 include circuitry that interconnects and controls communications between system components. The memory 304 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 304 optionally includes one or more storage devices remotely located from the CPU(s) 301. The memory 304 comprises a non-transitory computer readable storage medium.

In some implementations, the memory 304 or the non-transitory computer readable storage medium of the memory 304 stores the following programs, modules and data structures, or a subset thereof including an optional operating system 306, a virtual object kit obtainer 310, a virtual object kit synthesizer 320, and a virtual object synthesizer 330.

In various implementations, the virtual object kit obtainer 310 obtains existing virtual object kits. For example, the virtual object kit obtainer 310 obtains the multipede virtual object kit, the spaceship virtual object kit, the robot virtual object kit, the Xmas virtual object kit, and the candy virtual object kit represented by the affordances 20 in FIG. 1A. In some implementations, the virtual object kit obtainer 310 obtains the existing virtual object kits by accessing a digital asset store (e.g., a virtual object kit store).

In some implementations, the virtual object kit synthesizer 320 synthesizes a new virtual object kit by merging two or more existing virtual object kits. For example, as shown in FIG. 1G, the virtual object kit synthesizer 320 synthesizes the multipede-candy virtual object kit by merging the multipede virtual object kit and the candy virtual object kit.

In some implementations, the virtual object synthesizer 330 utilizes a virtual object kit (e.g., a newly created virtual object kit such as the multipede-candy virtual object kit shown in FIG. 1G) to synthesize virtual objects. In some implementations, the virtual object synthesizer 330 instantiates the virtual object in a CGR environment (e.g., an AR/VR environment) after synthesizing the virtual object.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a non-transitory memory and one or more processors coupled with the non-transitory memory:
        displaying a user interface for creating a new virtual object kit from a plurality of virtual object kits, the user interface including:
            a plurality of affordances for selecting respective ones of the plurality of virtual object kits;
            a selected kits area that indicates which of the plurality of virtual object kits have been selected; and
            a create affordance that, when activated, triggers creation of the new virtual object kit by merging the plurality of virtual object kits indicated in the selected kits area;
        detecting, via the user interface, a first user input selecting a first virtual object kit from the plurality of virtual object kits, wherein the first virtual object kit includes:
            a virtual object template for assembling a virtual object of a first virtual object type, wherein the first virtual object type is defined by a plurality of portions; and
            a first set of selectable components for the plurality of portions;
        detecting, via the user interface, a second user input selecting a second virtual object kit from the plurality of virtual object kits, wherein the second virtual object kit includes a plurality of virtual objects of a second virtual object type that is different from the first virtual object type;
        updating the selected kits area to indicate selection of the first virtual object kit and the second virtual object kit for creating the new virtual object kit;
        in response to detecting a third user input selecting the create affordance, determining whether the first virtual object kit and the second virtual object kit satisfy a merge criterion by determining whether at least a subset of the plurality of virtual objects from the second virtual object kit are compatible with the virtual object template from the first virtual object kit; and
        in response to determining that the first virtual object kit and the second virtual object kit satisfy the merge criterion, merging the first virtual object kit and the second virtual object kit in order to form a third virtual object kit that includes:
            the virtual object template from the first virtual object kit; and
            a second set of selectable components for the plurality of portions that replaces the first set of selectable components by not including the selectable components from the first set of selectable components and including at least the subset of the plurality of virtual objects from the second virtual object kit as selectable components for assembling the virtual object of the first virtual object type using the virtual object template.

2. The method of claim 1, wherein the first virtual object kit includes a plurality of virtual object templates, and wherein the merging comprises:
    selecting the virtual object template from the plurality of virtual object templates.

3. The method of claim 1, wherein the merging comprises:
    indicating that a first portion of the third virtual object kit is made from the first virtual object kit; and
    indicating that a second portion of the third virtual object kit is made from the second virtual object kit.

4. The method of claim 3, wherein the merging comprises:
    distributing, based on the first portion, a first amount of credits to a first entity that created the first virtual object kit; and
    distributing, based on the second portion, a second amount of credits to a second entity that created the second virtual object kit.

5. The method of claim 1, further comprising:
    transmitting the third virtual object kit.

6. The method of claim 5, wherein transmitting the third virtual object kit comprises:
    distributing the third virtual object kit via a digital asset store.

7. The method of claim 1, further comprising:
    receiving a credit in response to the third virtual object kit being used to synthesize the virtual object of the first virtual object type.

8. The method of claim 1, further comprising:
    receiving a credit in response to the third virtual object kit being merged with a fourth virtual object kit in order to form a fifth virtual object.

9. The method of claim 1, wherein obtaining the first virtual object kit comprises:
    receiving the first virtual object kit from a digital asset store where a first entity uploaded the first virtual object kit.

10. The method of claim 9, wherein obtaining the second virtual object kit comprises:
    receiving the second virtual object kit from the digital asset store where a second entity uploaded the second virtual object kit.

11. The method of claim 1, further comprising:
    after merging the first virtual object kit with the second virtual object to form the third virtual object kit:

obtaining a fourth virtual object kit that corresponds to a fourth virtual object type; and merging the third virtual object kit with the fourth virtual object kit in order to form a modified third virtual object kit.

12. The method of claim 11, wherein merging the third virtual object kit with the fourth virtual object kit comprises:

adding a virtual object template from the fourth virtual object kit to the third virtual object kit.

13. The method of claim 11, wherein merging the third virtual object kit with the fourth virtual object kit comprises:

adding one or more components from the fourth virtual object kit to the second set of selectable components.

14. The method of claim 1, further comprising:

receiving a request to assemble a virtual object, wherein the request includes a selection of components from the second set of selectable components in the third virtual object kit;

synthesizing the virtual object in accordance with the request; and instantiating the virtual object in an environment.

15. The method of claim 1, further comprising:

in response to determining that the merge criterion is not satisfied, displaying, on a display coupled with the device, a prompt indicating that the first virtual object kit and the second virtual object kit cannot be merged.

16. The method of claim 1, wherein the plurality of portions includes a first portion and a second portion;

wherein the first set of selectable components includes a first subset of selectable components for the first portion and a second subset of selectable components for the second portion; and wherein the second set of selectable components includes a third subset of selectable components that replaces the first subset and a fourth subset of selectable components that replaces the second subset.

17. A device comprising:

one or more processors;

a non-transitory memory;

a display; and one or more programs stored in the non-transitory memory, which, when executed by the one or more processors, cause the device to:

display a user interface for creating a new virtual object kit from a plurality of virtual object kits, the user interface including:

a plurality of affordances for selecting respective ones of the plurality of virtual object kits;

a selected kits area that indicates which of the plurality of virtual object kits have been selected; and a create affordance that, when activated, triggers creation of the new virtual object kit by merging the plurality of virtual object kits indicated in the selected kits area;

detecting, via the user interface, a first user input selecting a first virtual object kit from the plurality of virtual object kits, wherein the first virtual object kit includes:

a virtual object template for assembling a virtual object of a first virtual object type, wherein the first virtual object type is defined by a plurality of portions; and a first set of selectable components for the plurality of portions;

detect, via the user interface, a second user input selecting a second virtual object kit from the plurality of virtual object kits, wherein the second virtual object kit includes a plurality of virtual objects of a second virtual object type that is different from the first virtual object type;

update the selected kits area to indicate selection of the first virtual object kit and the second virtual object kit for creating the new virtual object kit;

in response to detecting a third user input selecting the create affordance, determine whether the first virtual object kit and the second virtual object kit satisfy a merge criterion by determining whether at least a subset of the plurality of virtual objects from the second virtual object kit are compatible with the virtual object template from the first virtual object kit; and in response to determining that the first virtual object kit and the second virtual object kit satisfy the merge criterion, merge the first virtual object kit and the second virtual object kit in order to form a third virtual object kit that includes:

the virtual object template from the first virtual object kit; and a second set of selectable components for the plurality of portions that replaces the first set of selectable components by not including the selectable components from the first set of selectable components and including at least the subset of the plurality of virtual objects from the second virtual object kit as selectable components for assembling the virtual object of the first virtual object type using the virtual object template.

18. The device of claim 17, wherein the first virtual object kit includes a plurality of virtual object templates, and wherein the merging comprises:

selecting the virtual object template from the plurality of virtual object templates.

19. The device of claim 17, wherein the one or more programs further cause the device to:

receive a request to assemble a virtual object, wherein the request includes a selection of components from the second set of selectable components in the third virtual object kit;

synthesize the virtual object in accordance with the request; and instantiate the virtual object in an environment.

20. A non-transitory memory storing one or more programs, which, when executed by one or more processors of a device including a display, cause the device to:

display a user interface for creating a new virtual object kit from a plurality of virtual object kits, the user interface including:

a plurality of affordances for selecting respective ones of the plurality of virtual object kits;

a selected kits area that indicates which of the plurality of virtual object kits have been selected; and a create affordance that, when activated, triggers creation of the new virtual object kit by merging the plurality of virtual object kits indicated in the selected kits area;

detect, via the user interface, a first user input selecting a first virtual object kit from the plurality of virtual object kits, wherein the first virtual object kit includes:

a virtual object template for assembling a virtual object of a first virtual object type, wherein the first virtual object type is defined by a plurality of portions; and a first set of selectable components for the plurality of portions;

detect, via the user interface, a second user input selecting a second virtual object kit from the plurality of virtual object kits, wherein the second virtual object kit includes a plurality of virtual objects of a second virtual object type that is different from the first virtual object type;

update the selected kits area to indicate selection of the first virtual object kit and the second virtual object kit for creating the new virtual object kit;

in response to detecting a third user input selecting the create affordance, determine whether the first virtual object kit and the second virtual object kit satisfy a merge criterion by determining whether at least a subset of the plurality of virtual objects from the second virtual object kit are compatible with the virtual object template from the first virtual object kit; and in response to determining that the first virtual object kit and the second virtual object kit satisfy the merge criterion, merge the first virtual object kit and the second virtual object kit in order to form a third virtual object kit that includes:

the virtual object template from the first virtual object kit; and a second set of selectable components for the plurality of portions that replaces the first set of selectable components by not including the selectable components from the first set of selectable components and including at least the subset of the plurality of virtual objects from the second virtual object kit as selectable components for assembling the virtual object of the first virtual object type using the virtual object template.

21. The non-transitory memory of claim 20, wherein the one or more programs further cause the device to:

in response to determining that the merge criterion is not satisfied, display, on the display, a prompt indicating that the first virtual object kit and the second virtual object kit cannot be merged.

22. The non-transitory memory of claim 20, wherein the one or more programs further cause the device to:

receive a request to assemble a virtual object, wherein the request includes a selection of components from the second set of selectable components in the third virtual object kit;

synthesize the virtual object in accordance with the request; and instantiate the virtual object in an environment.

\* \* \* \* \*